United States Patent
Takatsuka et al.

(10) Patent No.: US 12,003,845 B2
(45) Date of Patent: Jun. 4, 2024

(54) SENSOR APPARATUS HAVING ARRAY SENSOR FOR SENSOR-EQUIPPED DEVICE, SENSOR EQUIPPED DEVICE PROVIDED WITH SENSOR APPARATUS HAVING ARRAY SENSOR, AND CONTOL METHOD FOR SENSOR APPARATUS HAVING ARRAY SENSOR FOR SENSOR-EQUIPPED DEVICE

(71) Applicant: Sony Group Corporation, Tokyo (JP)

(72) Inventors: Susumu Takatsuka, Tokyo (JP); Hiroki Tetsukawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/912,063

(22) PCT Filed: Feb. 15, 2021

(86) PCT No.: PCT/JP2021/005518
§ 371 (c)(1),
(2) Date: Sep. 16, 2022

(87) PCT Pub. No.: WO2021/199734
PCT Pub. Date: Oct. 7, 2021

(65) Prior Publication Data
US 2023/0111580 A1    Apr. 13, 2023

(30) Foreign Application Priority Data
Mar. 31, 2020   (JP) .................................. 2020-062294

(51) Int. Cl.
*H04N 23/61*    (2023.01)
*G06V 10/147*   (2022.01)
(Continued)

(52) U.S. Cl.
CPC ........... *H04N 23/61* (2023.01); *G06V 10/147* (2022.01); *G06V 10/764* (2022.01); *H04N 23/64* (2023.01); *H04N 23/65* (2023.01)

(58) Field of Classification Search
CPC ............. H04N 25/772; H04N 1/00885; H04N 1/00888; H04N 1/00891; H04N 25/70
(Continued)

(56) References Cited

U.S. PATENT DOCUMENTS

| | | | | |
|---|---|---|---|---|
| 2004/0145594 A1* | 7/2004 | Kobayashi | ............ | G06T 19/006 345/633 |
| 2009/0207262 A1* | 8/2009 | Kurosawa | .......... | H04N 21/4223 348/E5.042 |

(Continued)

FOREIGN PATENT DOCUMENTS

| JP | 2015-41860 A | 3/2015 |
|---|---|---|
| JP | 2016-58793 A | 4/2016 |

(Continued)

OTHER PUBLICATIONS

International Search Report and Written Opinion dated May 11, 2021, received for PCT Application PCT/JP2021/005518, filed on Feb. 15, 2021, 10 pages including English Translation.

*Primary Examiner* — Usman A Khan
(74) *Attorney, Agent, or Firm* — XSENSUS LLP

(57) ABSTRACT

A sensor apparatus includes an array sensor in which a plurality of detection elements are arranged one-dimensionally or two-dimensionally, a signal processing unit which performs signal processing on a detected signal obtained by the array sensor, and an arithmetic operation unit which performs object detection from the detected signal obtained by the array sensor, performs operation control of the signal processing unit based on object detection, and performs switching processing for changing processing contents (Continued)

based on device information input from a sensor-equipped device on which the sensor apparatus is mounted.

18 Claims, 20 Drawing Sheets

(51) Int. Cl.
    *G06V 10/764*     (2022.01)
    *H04N 23/60*     (2023.01)
    *H04N 23/65*     (2023.01)

(58) Field of Classification Search
    USPC .......................................................... 348/372
    See application file for complete search history.

(56) References Cited

U.S. PATENT DOCUMENTS

| | | | |
|---|---|---|---|
| 2016/0295113 A1* | 10/2016 | Iqbal | .................... H04N 23/651 |
| 2017/0039723 A1* | 2/2017 | Price | ....................... G06T 7/174 |
| 2019/0158730 A1 | 5/2019 | Ejiri | |
| 2021/0136301 A1* | 5/2021 | Koizumi | ................ H04N 25/40 |

FOREIGN PATENT DOCUMENTS

| | | | | | |
|---|---|---|---|---|---|
| JP | 2017-228975 A | 12/2017 | | | |
| JP | 2019-36925 A | 3/2019 | | | |
| JP | 2019036925 A | * | 3/2019 | ........... | G06F 1/3212 |

\* cited by examiner

SENSOR APPARATUS HAVING ARRAY SENSOR FOR SENSOR-EQUIPPED DEVICE, SENSOR EQUIPPED DEVICE PROVIDED WITH SENSOR APPARATUS HAVING ARRAY SENSOR, AND CONTOL METHOD FOR SENSOR APPARATUS HAVING ARRAY SENSOR FOR SENSOR-EQUIPPED DEVICE

CROSS-REFERENCE TO RELATED APPLICATIONS

The present application is based on PCT filing PCT/JP2021/005518, filed Feb. 15, 2021, which claims priority to Japanese Patent Application No. 2020-062294, filed Mar. 31, 2020, the entire contents of each are incorporated herein by reference.

TECHNICAL FIELD

The present technology relates to a sensor apparatus, a sensor-equipped device, and a processing method of the sensor apparatus, and particularly to technology accompanied by input and output between the sensor apparatus and the sensor-equipped device.

BACKGROUND ART

The following PTL 1 discloses technology by which an image sensor includes an interface for a plurality of sensors such as an acceleration sensor and senses the movement of an image sensor-equipped device (for example, a smartphone or the like) to be able to perform imaging even in a state where an application processor is not started up.

CITATION LIST

Patent Literature

[PTL 1]
JP 2017-228975 A

SUMMARY

Technical Problem

The technology disclosed in PTL 1 is useful in that the image sensor has a function of performing imaging using an input of an external sensor as a trigger, but it is not possible to change operation parameters of the image sensor to optimum settings for an environment and an application in accordance with a battery residual capacity of the image sensor-equipped device, a communication situation, and the like.

Consequently, the present disclosure proposes technology by which a sensor apparatus can autonomously optimize processing in accordance with the state and operation of the device.

Solution to Problem

A sensor apparatus according to the present technology includes an array sensor in which a plurality of detection elements are arranged one-dimensionally or two-dimensionally, a signal processing unit which performs signal processing on a detection signal obtained by the array sensor, and an arithmetic operation unit which performs object detection from the detected signal obtained by the array sensor, performs operation control of the signal processing unit based on object detection, and performs switching processing for changing processing details based on device information input from a sensor-equipped device on which the sensor apparatus is mounted.

That is, the signal processing unit performs signal processing on the detected signal obtained by the array sensor and outputs the processed signal, and a processing operation in the signal processing unit is controlled based on object detection. In addition, processing contents in the signal processing unit and the arithmetic operation unit are switched between based on device information of the sensor-equipped device on which the sensor apparatus is mounted. For example, execution/non-execution of processing itself, the type of processing to be executed, parameter settings of processing, and the like may be switched.

Note that an object detected from the detected signal of the array sensor is an object to be detected, and any object is able to be the object to be detected mentioned here. For example, all objects such as people, animals, moving objects (automobiles, bicycles, flight vehicles, and the like), natural objects (vegetables, plants, and the like), industrial products/parts, buildings, facilities, mountains, seas, rivers, stars, the Sun, clouds, and the like can be target objects.

In addition, as the detection elements of the array sensor, an imaging element for visible light or non-visible light, a sound wave detection element that detects sound waves, a tactile sensor element that detects a tactile sensation, and the like are assumed.

The signal processing for the detected signal obtained by the array sensor may include all kinds of processing from reading processing of the detected signal obtained by the array sensor to processing for output from the sensor apparatus.

In the sensor apparatus according to the present technology, it is conceivable that the arithmetic operation unit perform processing for generating sensor operation information based on the object detection or the processing operation of the signal processing unit and transmitting the generated sensor operation information to the sensor-equipped device.

An operation state and an object detection state in the signal processing unit include information such as a confidence rate of object detection, a class, and an object area, a frame rate, processing parameters, image quality parameters, a resolution, and various other information. For example, the information is transmitted to the device.

In the sensor apparatus according to the present technology, it is conceivable that the arithmetic operation unit perform the switching processing based on previously registered registration information on the sensor-equipped device or registration information as operation switching conditions.

Since various circumstances differ depending on the type of device and the type of application in the device, switching processing is performed based on registration information set in advance.

In the sensor apparatus according to the present technology, it is conceivable that the arithmetic operation unit acquire power supply information as the device information.

As the power supply information, for example, a battery residual capacity of the device, a battery voltage, a battery temperature, the status of a power supply circuit, and the like are assumed.

In the sensor apparatus according to the present technology, it is conceivable that the arithmetic operation unit acquire communication status information as the device information.

As the communication status information, for example, a communication connection method, an execution throughput, whether or not connection can be performed, and the like are assumed.

In the sensor apparatus according to the present technology, it is conceivable that the arithmetic operation unit acquire information on a hardware or application of the sensor-equipped device as the device information.

As the information on the hardware or application of the device, for example, information on a hardware configuration such as the presence or absence of a micro control unit (MCU), the capability of the MCU, a temperature in equipment, sensor information, and a memory size, information on a target of an application, information of necessary metadata, and the like are assumed.

In the sensor apparatus according to the present technology, it is conceivable that the arithmetic operation unit perform processing for performing class identification on an object detected from the detected signal obtained by the array sensor and selecting parameters used for signal processing of the signal processing unit based on the identified class, as processing related to the switching processing.

That is, signal processing parameters for an image signal, for example a signal obtained by the array sensor, may be set based on class identification of a detected object.

Note that the processing related to switching processing is processing which is a target for some kind of switching such as processing in which execution/non-execution is switched between, processing in which processing details and parameters are switched between by switching processing, or processing selectively executed with other processing by switching processing.

In addition, the class is a category of an object recognized using image recognition. For example, objects to be detected such as "person", "automobile", "airplane", "ship", "truck", "bird", "cat", "dog", "deer", "frog", and "horse" are classified.

In the sensor apparatus according to the present technology, it is conceivable that the arithmetic operation unit set, based on the device information, a threshold value for all or some of parameters used for signal processing of the signal processing unit or detection processing of the array sensor to perform processing using parameters set based on the threshold value, as processing related to the switching processing.

A threshold value may be set, and parameters used in the image processing unit, the array sensor, and the like can be changed based on the threshold value.

Examples of the parameters related to the detection processing of the array sensor include an exposure time in the array sensor, a timing of reading from the array sensor, a frame rate, and the like.

Examples of the parameters related to signal processing include a resolution, the number of color tones, and the like of an image.

In the sensor apparatus according to the present technology, it is conceivable that the arithmetic operation unit perform processing for performing object detection from the detected signal obtained by the array sensor and giving an instruction for region information generated based on the detection of the object to the signal processing unit as region information on acquisition of the detected signal from the array sensor or signal processing of the detected signal, as processing related to the switching processing.

That is, the signal processing unit performs signal processing on a detected signal obtained by the array sensor and outputs the processed signal from an output unit, and region information on the acquisition of the detected signal from the array sensor or signal processing in the signal processing unit is set based on object detection.

In the sensor apparatus according to the present technology, it is conceivable that the arithmetic operation unit perform processing for performing object detection from the detected signal obtained by the array sensor, giving an instruction for region information generated based on the detection of the object to the signal processing unit as region information on acquisition of the detected signal from the array sensor or signal processing of the detected signal, performing class identification for an object detected from the detected signal obtained by the array sensor, and generating region information corresponding to the object using a template corresponding to the identified class, as processing related to the switching processing.

for example, templates of region information corresponding to classes such as a "person", an "automobile", and the like are prepared, and the templates are selected and used in accordance with class identification. For example, the templates indicate detection elements for which detection information needs to be acquired among the detection elements of the array sensor in accordance with the classes.

In the sensor apparatus according to the present technology, it is conceivable that the arithmetic operation unit perform processing for setting threshold values of parameters for all or some of the parameters used for signal processing of the signal processing unit or detection processing of the array sensor and setting parameters of processing for region information indicated by the template based on the threshold values, as processing related to the switching processing.

A threshold value is set, and parameters of processing of a region indicated by a template can be changed based on the threshold value.

In the sensor apparatus according to the present technology, it is conceivable that the arithmetic operation unit perform processing for performing object detection from the detected signal obtained by the array sensor and giving an instruction for region information generated based on the detection of the object to the signal processing unit as region information on acquisition of the detected signal from the array sensor or signal processing of the detected signal, as processing related to the switching processing, and the signal processing unit perform compression processing at a compression ratio different for each region on the detected signal obtained by the array sensor based on the region information received from the arithmetic operation unit.

That is, the signal processing unit sets a compression rate for each region by using region information.

In the sensor apparatus according to the present technology, it is conceivable that the arithmetic operation unit perform processing for setting an active area for the detected signal acquired from the array sensor based on information on past region information, performing object detection from a detected signal of the active area, and giving an instruction for region information generated based on the detection of the object to the signal processing unit as region information on acquisition of the detected signal from the array sensor or signal processing of the detected signal, as processing related to the switching processing.

That is, object detection for generating region information is performed based on information not from all regions of the array sensor but from a region set to be an active area.

Note that information related to region information is information of an object detected region which is the source of region information, region information itself, and the like.

In the sensor apparatus according to the present technology, it is conceivable that the arithmetic operation unit perform processing for performing object detection from the detected signal obtained by the array sensor and giving an instruction for making a frame rate of the detected signal obtained by the array sensor variable based on the detection of the object, as processing related to the switching processing.

That is, a frame rate of a detected signal obtained by the array sensor varies depending on an object detection result.

In the sensor apparatus according to the present technology, it is conceivable that the arithmetic operation unit set a threshold value of the frame rate in accordance with a class identified for an object detected from the detected signal obtained by the array sensor to perform processing using a frame rate set based on the threshold value, as processing related to the switching processing.

For example, a frame rate which is appropriate for object detection and capable of reducing the amount of data can be set in accordance with a class.

A sensor-equipped device according to the present technology includes a sensor apparatus, and a control unit which is able to communicate with the sensor apparatus, in which the sensor apparatus includes an array sensor in which a plurality of detection elements are arranged one-dimensionally or two-dimensionally, a signal processing unit which performs signal processing on a detected signal obtained by the array sensor, and an arithmetic operation unit which performs object detection from the detected signal obtained by the array sensor, performs operation control of the signal processing unit based on object detection, and performs switching processing of operation setting of the signal processing unit based on device information input from the control unit.

That is, the control unit inputs device information of the sensor-equipped device to the arithmetic operation unit in sensor apparatus.

In the sensor-equipped device according to the present technology, the arithmetic operation unit performs processing for generating sensor operation information based on a state of a processing operation of the signal processing unit or a state of object detection and transmitting generated sensor operation information to the control unit, and the control unit controls a device operation based on the sensor operation information.

That is, the arithmetic operation unit in the sensor apparatus outputs various information to the control unit of the sensor-equipped device.

A processing method of a sensor apparatus according to the present technology includes performing object detection from the detected signal obtained by the array sensor in the sensor apparatus, performing operation control of the signal processing unit based on object detection, and performing switching processing for changing processing contents based on device information input from a sensor-equipped device on which the sensor apparatus is mounted.

That is, the sensor apparatus itself can switch processing in accordance with information of the sensor-equipped device.

DESCRIPTION OF EMBODIMENTS

Hereinafter, an embodiment will be described in the following order.
<1. Configurations of sensor-equipped device and sensor apparatus>
<2. Various processing>
[2-1: Classification image adaptation]
[2-2: Image adaptation through threshold value setting]
[2-3: Area clipping]
[2-4: Area clipping using AROI]
[2-5: Area clipping using threshold value setting and AROI]
[2-6: Intelligent compression]
[2-7: Active area clipping]
[2-8: Active sampling]
[2-9: Active sampling through threshold value setting]
<3. Outline of operation based on input and output information>
<4. Processing example>
[4-1: First processing example]
[4-2: Second processing example]
[4-3: Third processing example]
<5. Another configuration example of sensor apparatus>
<6. Conclusion and example of application to each processing>

Further, in an embodiment to be described below, a sensor apparatus 1 serving as an image sensor that has an imaging element array and outputs an image signal as a detected signal will be described as an example. In particular, the sensor apparatus 1 according to the embodiment has an object detection function based on image analysis and is an apparatus that can be referred to as an intelligent array sensor (IAS).

1. Configurations of Sensor-Equipped Device and Sensor Apparatus

Figure 1:
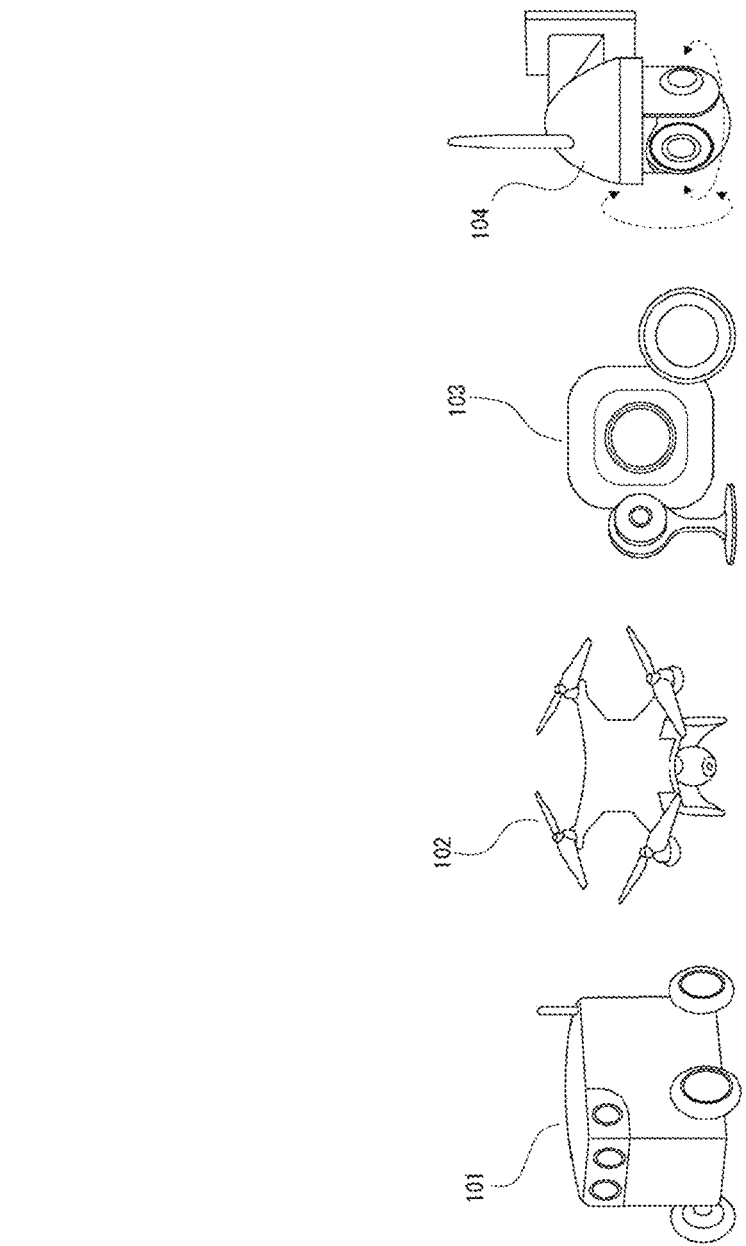
FIG. 1 is a diagram illustrating a sensor-equipped device according to an embodiment of the present technology.

FIG. 1 illustrates an example of a sensor-equipped device 100 according to the embodiment. The sensor-equipped device 100 is a device equipped with the above-described sensor apparatus referred to as an IAS, and examples thereof include a self-propelled robot 101, a small flight vehicle 102 such as a drone, communication equipment 103 referred to as an agent apparatus or IoT equipment, a monitoring camera 104, and the like as illustrated in the drawing.

In addition to these, examples thereof also include wearable devices such as a spectacles type, a headset type, and a wristwatch type, various home appliances, and the like.

These will be collectively referred to as the sensor-equipped device 100. Note that the sensor-equipped device 100 is also simply referred to as a "device 100".

Figure 2:
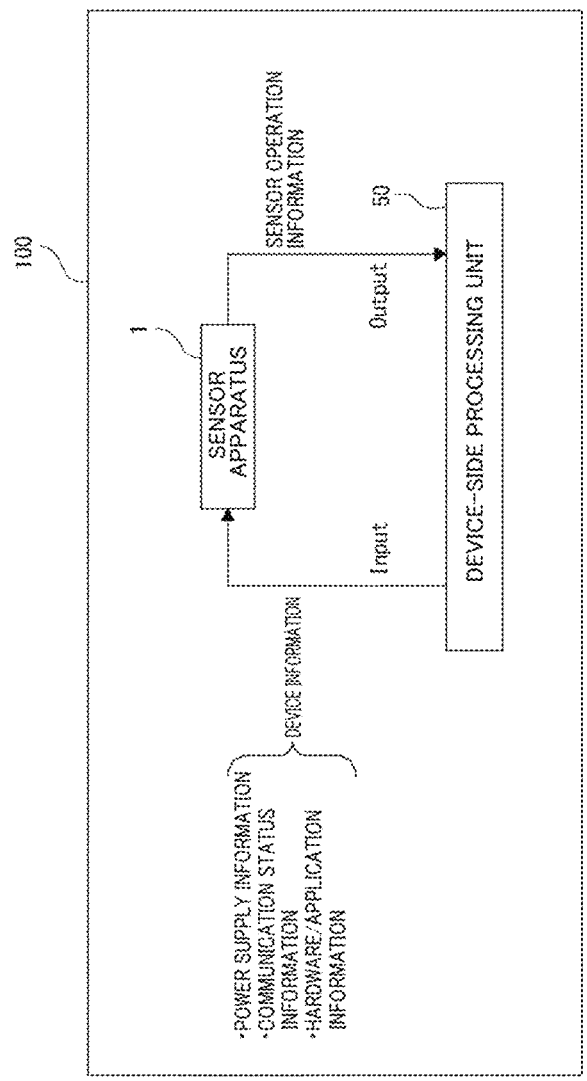
FIG. 2 is a diagram illustrating the sensor-equipped device and a sensor apparatus according to the embodiment.

FIG. 2 illustrates the sensor apparatus 1 and a device-side processing unit 50 in the sensor-equipped device 100.

As the device-side processing unit 50, a processor, a microcomputer, and the like that function as a control unit in the sensor-equipped device 100 are assumed.

The device-side processing unit 50 may be constituted by a plurality of processors. In addition, a sensor, a logic circuit, an actuator driving circuit, or the like may be assumed as the device-side processing unit 50 instead of an arithmetic operation processing apparatus such as a processor or a microcomputer.

Figure 3:
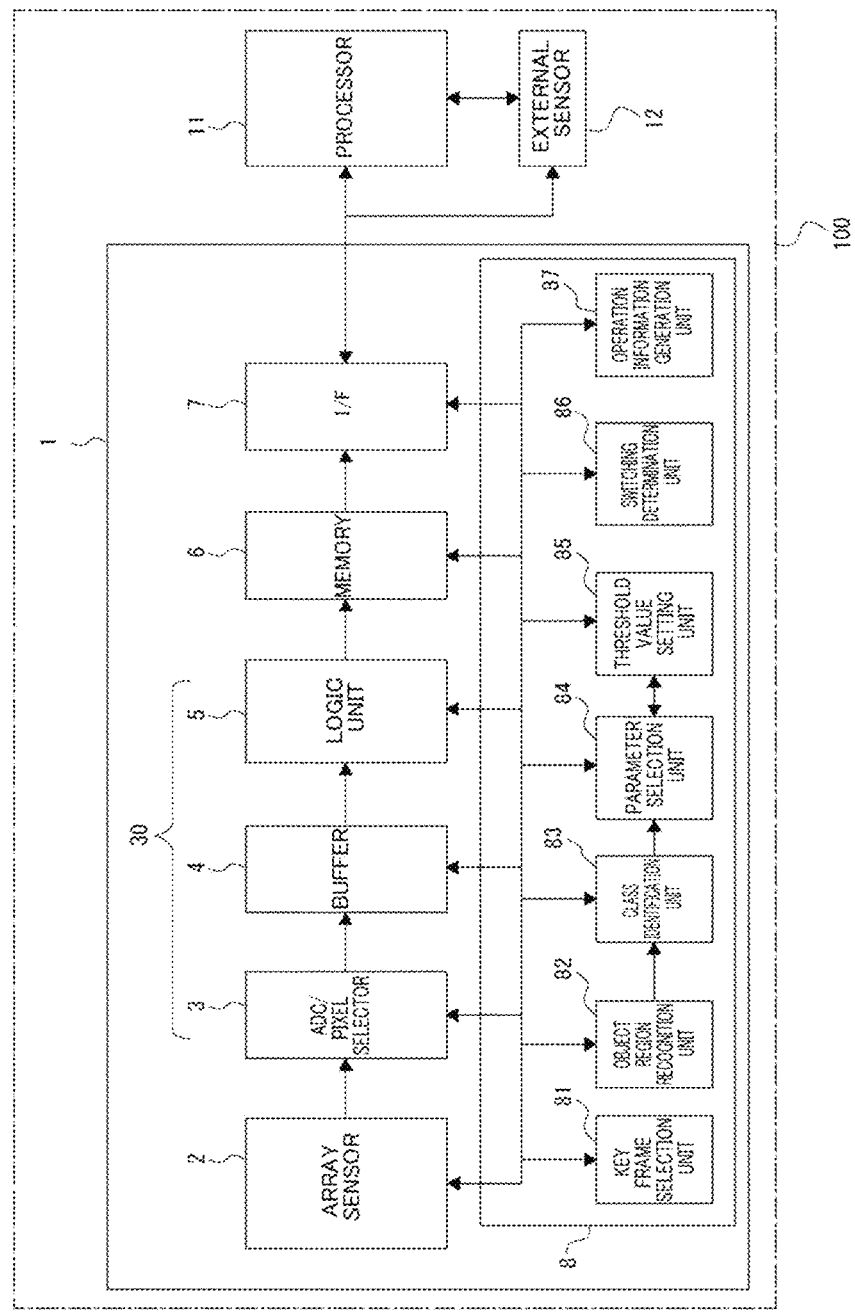
FIG. 3 is a block diagram of the sensor-equipped device and the sensor apparatus according to the embodiment.

The sensor apparatus 1 as an IAS is shown in detail in FIG. 3, and can perform image capturing by being mounted on the device 100 and perform object detection from an image and various arithmetic operation processing related to the object detection. Note that the object detection in the sensor apparatus 1 may be fixed as processing for improving the efficiency of processing and power saving rather than object detection performed by the device 100. For example, in the case of the device 100 in which the device-side processing unit 50 performs object detection, object detection is performed in the sensor apparatus 1 in order to improve the efficiency of processing of the device-side processing unit 50 and improve detection accuracy. Such a processing example will be described later. Naturally, in the case of the device 100 in which object detection is not performed by the device-side processing unit 50 or even in a case where object detection is performed, results of object detection performed in the sensor apparatus 1 may be used for any processing of the device 100.

Interfaces for inputting and outputting various data to and from each other are formed between the sensor apparatus 1 and the device-side processing unit 50. In general, in a device equipped with a sensor apparatus, sensing signals (an image signal, a detected signal, and the like) obtained by the sensor apparatus are naturally supplied to a processing unit on the device side, but the interface mentioned here is not an interface for such sensing signals and is an interface for, for example, device information or sensor operation information as illustrated in the drawing other than the sensing signals.

From the point of view of the sensor apparatus 1, device information is input from the device-side processing unit 50. Examples of the device information include power supply information, communication status information, hardware/application information, and the like of the device 100.

In addition, the sensor apparatus 1 outputs sensor operation information to the device-side processing unit 50. The sensor operation information is information indicating the state of a signal processing operation of a sensing signal in the sensor apparatus 1 and information based on object detection.

Examples of the information indicating the state of a signal processing operation include various information such as a frame rate of an image, processing parameters, image quality parameters, a resolution, and other parameters related to signal processing.

Examples of the information based on object detection include information such as a confidence rate, a class, and an object area of object detection, and the like.

FIG. 3 mainly illustrates a detailed configuration example of the sensor apparatus 1.

In FIG. 3, a processor 11 and an external sensor 12 are also illustrated as apparatuses that perform data communication with the sensor apparatus 1. In this example, it is assumed that the processor 11 is equivalent to the device-side processing unit 50 in FIG. 2.

The sensor apparatus 1 includes an image sensor device, a storage region such as a Dynamic Random Access Memory (DRAM), and a constituent part as an artificial intelligence (AI) function processor as hardware. An integrated device is formed by the three components constituting a three-layered structure, a so-called flat configuration being formed by one layer, or a laminated structure being constituted by two layers (for example, a DRAM and an AI function processor are the same layer), or the like.

As illustrated in FIG. 3, the sensor apparatus 1 includes an array sensor 2, an Analog to Digital Converter (ADC)/pixel selector 3, a buffer 4, a logic unit 5, a memory 6, an interface (I/F) unit 7, and an arithmetic operation unit 8.

The ADC/pixel selector 3, the buffer 4, and the logic unit 5 serve as a signal processing unit 30 that performs signal processing in order to output a detected signal obtained by the array sensor 2 to the outside.

The array sensor 2 is configured such that a detection element is an imaging element of visible light or invisible light, and a plurality of imaging elements are arranged one-dimensionally or two-dimensionally. For example, the array sensor is configured such that a large number of imaging elements are two-dimensionally arranged in a row direction and a column direction, and a two-dimensional image signal is output by photoelectric conversion in each of the imaging elements.

The ADC/pixel selector 3 converts an electrical signal having been subjected to photoelectric conversion by the array sensor 2 into digital data and outputs an image signal as the digital data.

Note that the ADC/pixel selector 3 has a pixel selection function for pixels (imaging elements) of the array sensor 2 and thus may be able to read a photoelectric conversion signal with respect to only pixels selected in the array sensor 2, convert the read signal into digital data, and output the digital data.

That is, the ADC/pixel selector 3 can output digital data of a photoelectric conversion signal with respect to only selected pixels although digital data of a photoelectric conversion signal with respect to all of valid pixels constituting an image of one frame is normally output.

Although image signals are read in units of frames by the ADC/pixel selector 3, the image signals of the frames are temporarily stored in the buffer 4, read at appropriate timings, and provided for the processing of the logic unit 5.

The logic unit 5 performs various types of necessary signal processing (image processing) on each input frame image signal.

For example, it is assumed that the logic unit 5 performs image quality adjustment by processing such as color correction, gamma correction, color gradation processing, gain processing, contour emphasis processing, contrast adjustment processing, sharpness adjustment processing, and gray level adjustment processing.

In addition, it is also assumed that the logic unit 5 performs processing for changing a data size, such as data compression processing, resolution conversion, frame rate conversion, aspect ratio conversion, and sampling rate change.

Parameters used for each processing are set for each processing performed by the logic unit 5. For example, there are setting values such as color and brightness correction coefficients, gain values, compression rates, frame rates, resolutions, processing target regions, and sampling rates. The logic unit 5 performs necessary processing using parameters set for each processing. The arithmetic operation unit 8 may set these parameters in the present embodiment.

Image signals processed by the logic unit 5 are stored in the memory 6.

The image signals stored in the memory 6 are transmitted and output to the external processor 11 or the like through the interface unit 7 at a necessary timing.

Note that a DRAM, a static random access memory (SRAM), a magnetoresistive random access memory (MRAM), and the like are conceivable as the memory 6. Note that an MRAM is a memory that stores data using magnetism and is known to use a tunneling magnetoresistive (TMR) element instead of a magnetic core.

A TMR element has an extremely thin insulating layer including several atoms interposed between magnetic substances, and an electrical resistance thereof varies according to a direction of magnetization of magnetic layers. A magnetization direction of a TMR element does not change even when power is not supplied, and thus may serve as a nonvolatile memory. Since a write current needs to increase with the progress of miniaturization, a spin torque transfer (STT)-MRAM using an STT in which electrons with uniform spin flow for writing without a magnetic field being used is known for miniaturization of a memory cell. Naturally, storage elements other than this may be conceived as a specific example of the memory 6.

The external processor 11 of the sensor apparatus 1 can execute necessary object detection and the like by performing image analysis and image recognition processing on the image signals transmitted from the sensor apparatus 1. Alternatively, the processor 11 may perform signal processing for storage, communication, display, and the like of image signals.

The external processor 11 can also refer to detection information of the external sensor 12.

Note that the processor 11 is mounted on the device 100 together with the sensor apparatus 1, but it is conceivable that the processor 11 be connected to the sensor apparatus 1 in a wired or wireless manner.

The arithmetic operation unit 8 is configured as, for example, one AI processor. The arithmetic operation unit 8 includes a key frame selection unit 81, an object region recognition unit 82, a class identification unit 83, a parameter selection unit 84, a threshold value setting unit 85, a switching determination unit 86, and an operation information generation unit 87 as executable arithmetic operation functions as illustrated in the drawing. Further, these arithmetic operation functions may be configured by a plurality of processors.

The arithmetic operation unit 8 can also communicate with the processor 11 through the interface unit 7. For example, the arithmetic operation unit 8 can input device information from the processor 11 through the interface unit 7 as illustrated in FIG. 2. In addition, the arithmetic operation unit 8 can output sensor operation information to the processor 11 through the interface unit 7.

The key frame selection unit 81 in the arithmetic operation unit 8 performs processing for selecting a key frame in a frame of an image signal as a moving image in response to a predetermined algorithm or an instruction.

The object region recognition unit 82 performs detection of a region of an object serving as a detection candidate and area recognition processing of a detection target object in an image (frame) on a frame of an image signal which is subjected to photoelectric conversion by the array sensor 2 and read by the ADC/pixel selector 3.

An object detected from an image signal means an object that can be a detection target for the purpose of recognition from an image. Although an object that becomes a detection target is determined depending on detection purposes, processing capabilities, application types, and the like of the sensor apparatus 1 and the processor 11, any object has a possibility of being a detection target mentioned here. Some examples of possible detection target objects include animals, moving objects (automobiles, bicycles, flight vehicle, and the like), natural objects (vegetables, plants, and the like), industrial products/parts, buildings, facilities, mountains, seas, rivers, stars, the Sun, clouds, and the like.

The class identification unit 83 performs class classification on an object detected by the object region recognition unit 82.

The class is a category of an object recognized using image recognition. For example, objects to be detected such as "person", "automobile", "airplane", "ship", "truck", "bird", "cat", "dog", "deer", "frog", and "horse" are classified.

The parameter selection unit 84 stores parameters for signal processing corresponding to classes, and selects one or a plurality of corresponding parameters by using the class of a detected object identified by the class identification unit 83, the area thereof, and the like. Then, the parameter selection unit 84 sets the one or more parameters in the logic unit 5.

The threshold value setting unit 85 has a function as a DNN engine and performs processing for setting threshold values of parameters on all or some of the parameters used for image processing of the logic unit 5 or imaging processing related to imaging of the array sensor 2 (processing of the array sensor 2 and the ADC/pixel selector 3).

In addition, the threshold value setting unit 85 causes all or some of the logic unit 5, the array sensor 2, and the ADC/pixel selector 3 to perform processing using parameters changed based on threshold values.

Specifically, the threshold value setting unit 85 changes, for example, parameters used for image processing in the logic unit 5 and sets the changed parameters in the logic unit 5.

Alternatively, the threshold value setting unit 85 changes, for example, parameters used for an exposure operation in the array sensor 2 and imaging processing such as reading processing of the ADC/pixel selector 3 and AD conversion processing based on threshold values and sets the changed parameters in the array sensor 2 and the ADC/pixel selector 3.

The switching determination unit 86 performs switching determination of processing contents of the sensor apparatus 1 based on device information which is input from the processor 11, registration information (to be described later) which is set in advance, and the like, and performs switching control of processing contents as necessary. For example, the switching determination unit 86 performs switching control such as execution/non-execution of processing itself, the type of processing to be executed, and parameter settings of processing.

The operation information generation unit 87 generates sensor operation information based on a processing operation of the signal processing unit 30 or object detection of the arithmetic operation unit 8 and performs processing for transmitting the generated sensor operation information to the processor 11. Examples of the sensor operation include information such as a confidence rate of object detection, a class, and an object area, a frame rate, processing parameters, image quality parameters, a resolution, and various other information.

These functions of the arithmetic operation unit 8 are processes that are not normally performed in an array sensor, and object detection, class recognition, coloring processing, and the like are executed in the array sensor in the present embodiment. Thereby, an image signal to be supplied to the processor 11 is appropriate for the device 100.

Note that, in addition to outputting an image signal to the processor 11, the interface unit 7 can output the above-described sensor operation information as, for example, metadata together with the image signal or can output the sensor operation information independently of the image signal. In addition, for example, it is also possible to output only class information, and the like.

In addition, for example, it is also conceivable that the processor 11 gives an instruction for necessary information to the interface unit 7, and the interface unit 7 passes the corresponding information to the arithmetic operation unit 8 and the like.

2. Various Processing

Here, various processing that can be performed by the sensor apparatus 1 including the arithmetic operation unit 8 is described. Hereinafter, as processing examples, classification image adaptation, image adaptation based on threshold value setting, area clipping, area clipping using AROI, area clipping using threshold value setting and AROI, intelligent compression, active area clipping, active sampling, and active sampling based on threshold value setting will be described in order.

Note that each of these processes is an example of processing related to switching processing based on the function of the switching determination unit 86. The processing related to switching is processing which is a target for some kind of switching such as processing in which execution/non-execution of itself is switched between, processing in which processing contents and parameters are switched between by switching processing, or processing selectively executed with other processing by switching processing.

[2-1: Classification Image Adaptation]

Classification image adaptation is processing for setting parameters of processing of the signal processing unit 30 in accordance with an object class.

The key frame selection unit 81 performs processing for selecting a key frame among frames of an image captured at a timing corresponding to a key frame selection algorithm.

The sensor apparatus 1 selects a key frame from image signals in units of frames which are pixel array output signals of the array sensor 2 and performs image recognition to recognize the class of a subject to be imaged. A key frame is selected in accordance with a key frame selection algorithm, and thus a still image (any one frame) is selected.

An example of a key frame selection algorithm will be described.

First, there is a method of selecting one frame for each designated time interval. For example, one frame is set to be a key frame at intervals of 30 seconds. Naturally, 30 seconds is an example.

In addition, it is also conceivable that a key frame is selected at a timing according to a command from the outside of the sensor apparatus 1 (the processor 11 or the like). For example, the key frame is selected in response to an instruction received from a device or equipment on which the sensor apparatus 1 is mounted. For example, in is a case where the sensor apparatus 1 is mounted on an automobile and the automobile is stopped in a parking lot, a key frame may nevertheless be selected at a timing when the automobile starts traveling.

In addition, a method of selecting a key frame may be changed depending on a situation. For example, in a case where the sensor apparatus 1 is mounted on an automobile, the interval of a key frame is changed during stopping of the automobile, during normal traveling, and during high-speed traveling.

When a key frame is selected, the object region recognition unit 82 detects the position of a candidate for an object in the key frame.

That is, the object region recognition unit 82 searches for a candidate for an object to be detected in an image of the key frame and obtains the positions of one or a plurality of candidates (position coordinates in the image).

The class identification unit 83 performs classification of the detected object into a class. That is, class identification is performed on each of the candidates for the object to classify the candidates.

As described above, the class is a category of an object recognized using image recognition. For example, class identification such as "person" and "flower" is performed on the detected object.

The parameter selection unit 84 performs parameter control corresponding to the class obtained as a result of the class identification.

For example, the parameter selection unit 84 selects a parameter set based on classes of objects, the number of objects, the areas of objects, and the like.

For example, in a case where one class is present in an image, the parameter selection unit 84 selects a parameter set corresponding to the class. For example, in a case where a "person" is present in the identified class, the parameter selection unit 84 selects a parameter set that is appropriate for an image of the person.

In a case where there are objects of a plurality of types of classes in a screen, the following examples are conceivable.

For example, it is conceivable to select a parameter set corresponding to a class in which the number of objects is largest among the classes.

Alternatively, in a case where there are objects of a plurality of types of classes in a screen, it is conceivable to select a parameter set corresponding to the class of an object having the largest area.

Alternatively, in a case where there are objects of a plurality of types of classes in a screen, it is conceivable to select a parameter set corresponding to a class in which a total area for each class is largest.

Alternatively, in a case where there are objects of a plurality of types of classes in a screen, it is conceivable to obtain a class of a highest priority from the number of objects and a total area (or a maximum value) for each class and to select a parameter set corresponding to the class.

Naturally, there are various other methods of selecting a parameter set, and a parameter set corresponding to the class of a dominant object in a screen or the class of an object to be detected preferentially may be selected in any cases.

In addition, the parameter selection unit 84 performs processing for setting a selected parameter set in the logic unit 5.

Thereby, the logic unit 5 subsequently performs various image processing using a set parameter set on image signals of frames which are input sequentially.

The processed image signals, set parameters, information of an identified class, and the like are temporarily stored in the memory 6.

The sensor apparatus 1 can output all or at least any one of pieces of information such as image signals (a still image, a moving image), class identification information (a class, the number of objects, and the like), and a used parameter set in response to a request of the processor 11.

That is, any one piece of information temporarily stored in the memory 6 is read by the interface unit 7 and transmitted in response to a request of the processor 11.

By the above-described processing, an image signal having been subjected to parameter setting in accordance with the presence of a class of an object included in an image is supplied to the processor 11. The image signal is an image signal having been subjected to image processing so as to obtain an image quality appropriate for the class or an image signal having been subjected to image processing appropriate for object detection of the class.

[2-2: Image Adaptation Through Threshold Value Setting]

Image adaptation based on threshold value setting is a processing example in which an idea of parameter change corresponding to threshold setting is added to the above-described classification image adaptation processing.

As an example of parameters mentioned here, parameters used in image processing in the logic unit 5 are assumed, and the parameters of image processing used in the logic unit 5 are set (adjusted and changed), for example, to satisfy a threshold value which is set in the sensor apparatus 1.

In addition, as the parameters, parameters used for signal reading in the ADC/pixel selector 3 and imaging processing such as an exposure operation in the array sensor 2 are also assumed. Control parameters of imaging processing operations of the ADC/pixel selector 3 and the array sensor 2, and the like are set (adjusted and changed), for example, to satisfy a threshold value which is set in the sensor apparatus 1.

In the above-described classification image adaptation, parameters used by the logic unit 5 are selected in accordance with class identification, but the selected parameters can also be set (adjusted and changed) based on a threshold value. Alternatively, the parameters are not necessarily limited to those selected based on class identification, and it is conceivable that the parameters be set based on a threshold value as long as the parameters are used in the logic unit 5, the ADC/pixel selector 3, and the array sensor 2.

Specific examples of parameters related to imaging processing and parameters related to image processing which are automatically set based on a threshold value in this manner will be described.

For example, the parameters related to image processing are exemplified as follows.

Image aspect ratio

Resolution

The number of color tones (the number of colors, or the number of bits)

Contrast adjustment value

Sharpness adjustment value

Gray level adjustment value

Gamma correction value

Sampling rate conversion ratio

The parameters of the image aspect ratio and the resolution are also reflected in an ROI 21 to be described later.

The number of color tones, the contrast adjustment value, the sharpness adjustment value, the gray level adjustment value, the gamma correction value, and the resolution are parameters related to image quality.

The sampling rate conversion ratio is a parameter of a time resolution.

In addition, the parameters related to imaging processing are as follows.

Sampling rate

Resolution (for example, a resolution which is set at a point in time of reading of the ADC/pixel selector 3)

Shutter speed (exposure time) of the array sensor 2

Naturally, the parameters which are automatically set based on a threshold value also include parameters other than the parameters listed above.

Such setting based on a threshold value of a parameter is performed to achieve a reduction in the amount of data, an increase in the speed of processing, low power consumption, and the like while securing practical accuracy for an output of object detection, for example, in a case where the processor 11 performs object detection based on learning using a Deep Neural Network (DNN).

That is, the amount of imaging data is reduced by changing parameters such as a resolution and the number of colors, but this also allows the accuracy of object detection to be maintained at a required level.

Figure 4:
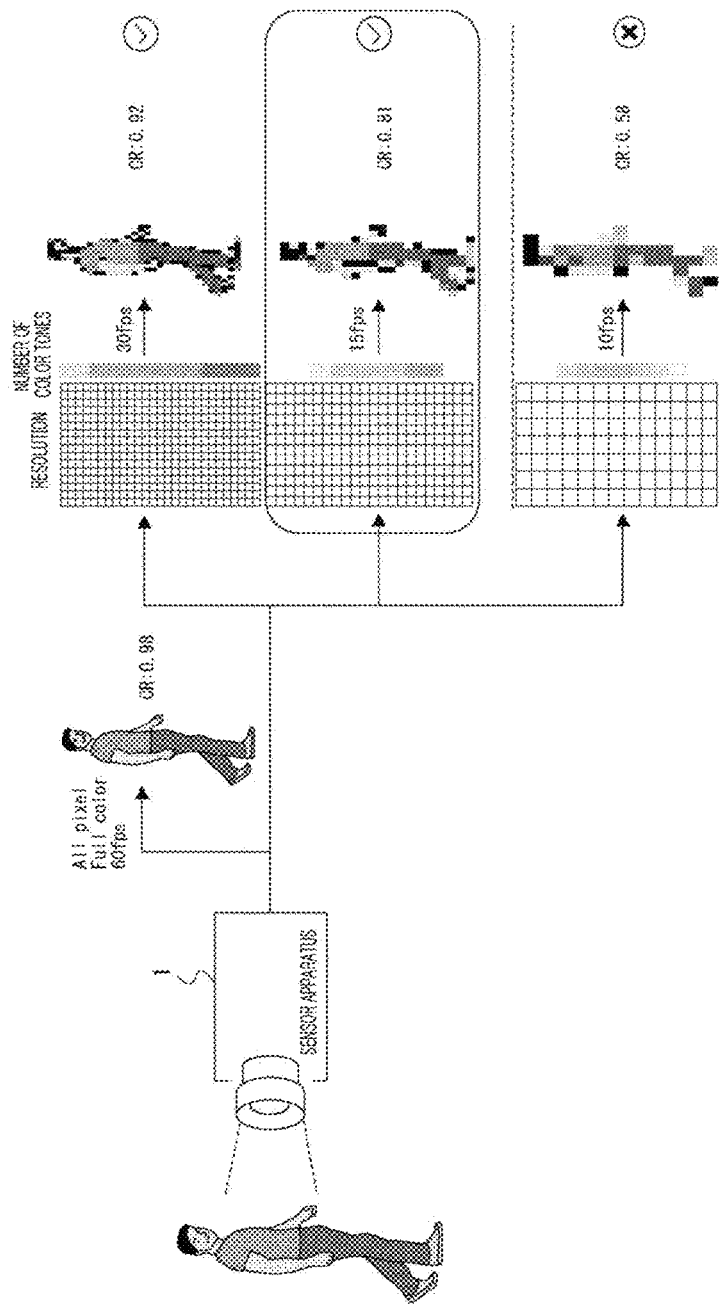
FIG. 4 is a diagram illustrating threshold value setting for image adaptation processing according to the embodiment.

In FIG. 4, an idea of parameter setting based on a threshold value is described. For example, in a case where the sensor apparatus 1 images a person, it is assumed that the output image has information of all pixels (all valid pixels) of the array sensor 2, and full-color image data is output, for example, at a frame rate of 60 fps (frames per second).

In addition, for example, in a case where the processor 11 performs object detection on such image data, it is assumed that a person can be detected correctly at a rate of 98% as a confidence rate CR=0.98. The confidence rate is a rate of certainty at which an object can be correctly distinguished and detected.

On the other hand, it is assumed that a confidence rate CR is set to 0.92 in a case where image data with a resolution slightly lowered, the number of color tones slightly lowered, and a frame rate set to 30 fps is output. Further, it is assumed that a confidence rate CR is set to 0.81 in a case where image data with a resolution more lowered, the number of color tones more lowered, and a frame rate set to 15 fps is output.

Further, it is assumed that a confidence rate CR is set to 0.58 in a case where image data with a resolution drastically reduced, the number of color tones drastically reduced, and a frame rate set to 10 fps is output.

The above is just an example for explanation, but a confidence rate fluctuates by changing parameters related to imaging or image quality such as a resolution, the number of colors, and a time resolution of image data to be analyzed in this manner. That is, the accuracy of image analysis and object detection varies.

Incidentally, a confidence rate for object detection is high, but in reality, the highest rate is not always required.

Figure 5:
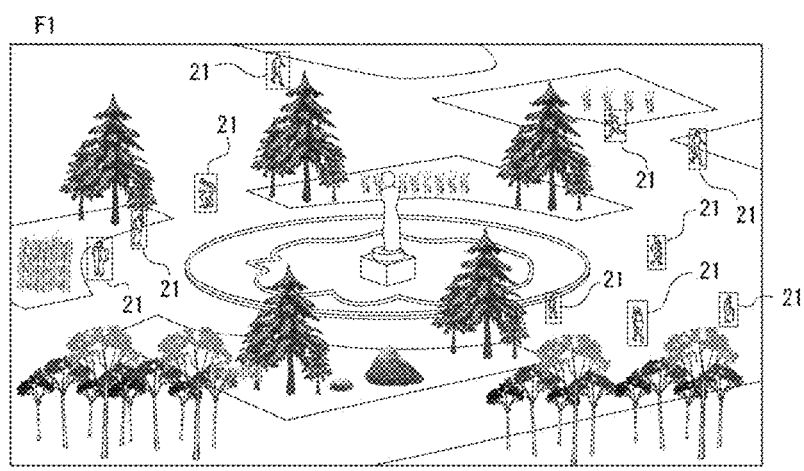
FIG. 5 is a diagram illustrating a frame in which area clipping is performed according to the embodiment.
Figure 5:
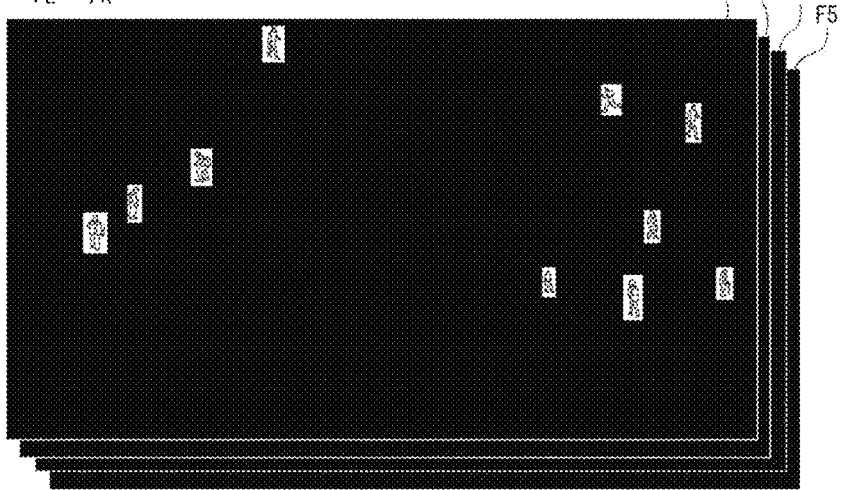

For example, when considering a case where the number of people is desired to be roughly detected from an image obtained by taking a bird's-eye view of a park as illustrated in FIG. 5A, too high accuracy is not required. For example, in a case where a detection result indicating several people, approximately 10 people, approximately 20 people, or the like is obtained, a confidence rate CR of approximately 0.6 may be sufficient.

On the other hand, in a case where the intrusion of a person is desired to be strictly monitored with a security camera or the like, a confidence rate CR of approximately 0.95 may be required.

In addition, a confidence rate CR of 0.70 may be set during the daytime, but there may be a desire to set a confidence rate CR of approximately 0.90 during the nighttime.

That is, a confidence rate CR required for the accuracy of object detection differs depending on various factors such as the purpose, target, type of equipment/application program, time, and region for the detection.

Further, a confidence rate also fluctuates depending on an analysis ability and the degree of learning of the processor 11, and also fluctuates depending on an object to be detected and a class.

From these things, for example, by determining a threshold value based on an appropriate required confidence rate and changing parameters accordingly, it is possible to output an image signal that meets requirements for object detection and the like.

Not, in the example of FIG. 4, it is assumed that a confidence rate CR of 0.80 or more is required.

In this case, parameters having a threshold value of 0.80 or more as a confidence rate CR is calculated, and parameters used in the logic unit 5 and the like are set. In particular, parameters that are higher than the threshold value but have a relatively small amount of data are set.

For example, parameters such as a resolution, the number of color tones, and a frame rate in which a confidence rate CR is 0.81 illustrated in the drawing are set. Then, as compared with a case where parameters are set so that a confidence rate CR is set to, for example, 0.98 and an image signal is output, it is possible to drastically reduce the amount of data and maintain required object detection accuracy.

Note that, although a "threshold value" may be considered as a value required as a confidence rate, the threshold value can also be considered as the value of a parameter for obtaining a confidence rate as a required "threshold value" in the sense of a threshold value calculated for parameter adjustment.

That is, in the technical sense, for processing of "setting a threshold value of a parameter and performing processing using the parameter set based on the threshold value", a processing method as described in the following [1] and [2] is assumed.

[1] A threshold value of an index value such as a confidence rate appropriate for a usage mode and a usage environment is calculated, and a parameter to be actually used as a parameter value for obtaining an index value exceeding the threshold value of the index value are set. That is, a threshold value of a parameter is set from the viewpoint of an index value of object detection.

[2] A threshold value of a parameter for obtaining a value required as an index value such as a confidence rate is calculated, and a parameter to be actually used based on the threshold value is set. That is, a threshold value of a parameter is set from the viewpoint of the value of the parameter itself.

In the present embodiment, for example, a threshold value is set as in the above-described [1] or [2] based on a confidence rate, and parameters to be actually used are set to be parameters adapted to reduce the amount of image data as much as possible. Such parameters are calculated in real time (for example, periodically during imaging) to dynamically change the parameters. For example, an increase in speed, a reduction in power consumption, and an increase in accuracy which are adapted to an application and the like are performed by calculating an appropriate threshold value and corresponding parameters by DNN processing according to the application of the sensor apparatus 1, a target class, and an imaging environment and changing the parameters.

In particular, for parameter adjustment, a threshold value based on a confidence rate of object detection is set, and a setting value of a parameter which is as close to the threshold value as possible and does not fall below the threshold value is calculated.

Further, it is appropriate that the threshold and the corresponding parameters are set for each class. For example, the detection accuracy and required accuracy for the quality of an image signal differ depending on the class of an object such as a "human face" and a "road sign", and thus it is appropriate to set a threshold value and change parameters according to the class.

In addition, the threshold value and the corresponding parameter are set by using a maximum value of a confidence rate, changed in accordance with a battery residual capacity, and changed so that object tracking at the time of object detection can be maintained.

Thereby, signal processing can be executed according to the purpose of object detection, an operation situation, an environment, and the like.

[2-3: Area Clipping]

Area clipping is an example of processing in which an object is detected by using only a specific area in the entire image as a processing target.

Regarding an image signal detected by the array sensor 2, it is usually conceivable to transmit information of all pixels of each frame to the processor 11 to execute image recognition.

However, when information of all pixels of all frames is transferred to the processor 11 and object detection is performed by the processor 11, the amount of transferred information increases remarkably and a transfer time is also required, particularly as an image captured by the array sensor 2 becomes higher in definition. Further, in the case of cloud transmission, an increase in the amount of communication greatly affects communication costs and time.

Further, a load of a storage amount in the processor 11 and a cloud also increases, and an analysis processing load and a processing time also increase, which results in a concern that an object detection performance may deteriorate.

Consequently, once a necessary object is recognized in an image of a certain frame, an image signal is acquired and transferred at substantially a pixel level of the region of the object from the next frame and the subsequent frames, and pixels of the other regions are prevented from being present as information, thereby improving the efficiency of processing.

Figure 6:
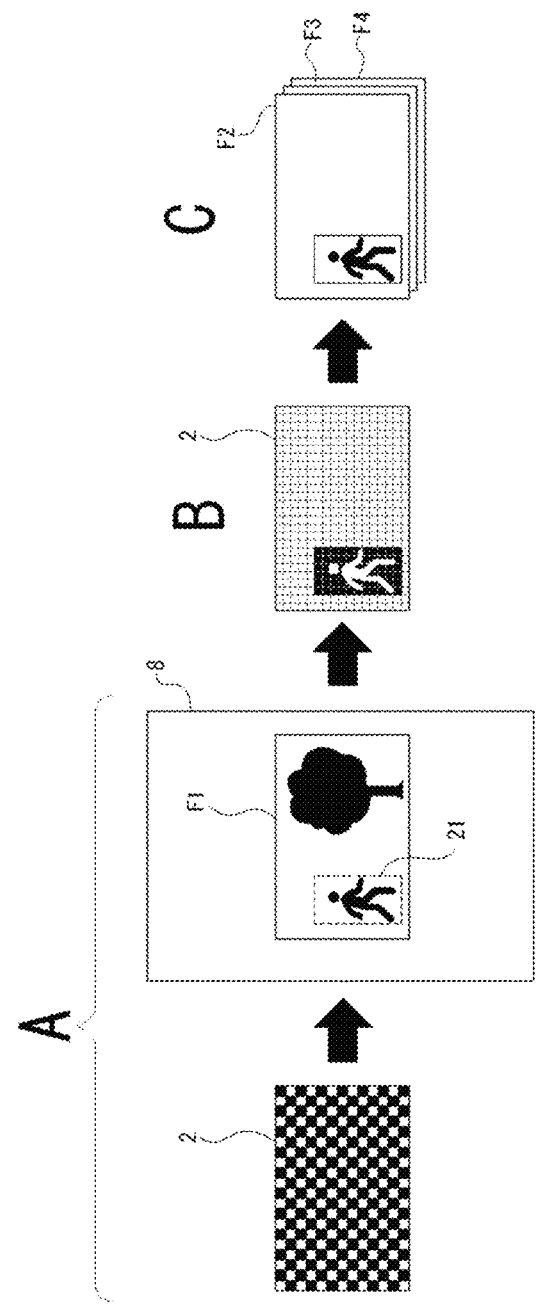
FIG. 6 is a diagram illustrating area clipping analysis and a region of interest (ROI) according to the embodiment.

An outline is illustrated in FIG. 6.

An image of a certain frame F1 is illustrated in FIG. 6A. In a case where a "person" is set as an object to be detected, a region of the person is detected in the image of the frame F1. In addition, the region in which a person has been detected is set to be a region of interest (ROI) 21 which is an interest region.

In the subsequent frames F2, F3, . . . , and Fn, only pixels in the region set to be the ROI 21 are read from the array sensor 2. The image is an image including only information of the portion of the ROI 21 as illustrated in FIG. 6B.

In addition, analysis in the arithmetic operation unit 8 is performed based on an image signal including such partial pixel information, or the image is transferred to the processor 11 and analyzed.

Specifically, as schematically illustrated in FIG. 6A, a certain frame F1 as a ratio of one to N frames among image signals obtained by the array sensor 2 is set to be an image including information on all valid pixels. In addition, the arithmetic operation unit 8 scans the entire screen to detect the presence or absence and position of an object. Then, the ROI 21 is set.

When the subsequent frame F2 is acquired, an image signal on which AD conversion has been performed in only the pixels of the ROI 21 set to be a target area is acquired as illustrated in FIG. 6B. Note that squares separated by a grid in the drawing indicate pixels.

In this manner, for example, an object is detected by performing full-screen scanning in only one frame for every N frames, and image analysis is performed for only a detection area of an object in the previous frame in the subsequent frames F2, F3, F4 . . . as illustrated in FIG. 6C.

By performing this process, the amount of analysis data and the amount of communication data are reduced without degrading the accuracy of object detection targeted by an application, and a reduction in power consumption of the sensor apparatus 1 and an increase in the speed of image analysis related to object detection of the entire system having the sensor apparatus 1 mounted thereon are performed.

[2-4: Area Clipping Using AROI]

An advanced ROI (also referred to as an "AROI") is an ROI which is set using a template set in accordance with a class.

The array sensor 2 (image sensor) consumes the largest amount of power in photoelectric conversion. For this reason, in order to reduce power consumption, the number of pixels to be subjected to photoelectric conversion is desired to be reduced as much as possible.

In addition, an image signal obtained by the array sensor 2 is used for image analysis and is not seen by a person, and thus the image signal does not need to be visible and recognizable by a person or to be a clear image. In other words, it is important that the image can perform object detection with high accuracy.

For example, in the above-described area clipping, class identification is performed on a detected object, but when class identification is performed in this manner, a minimum area for recognition corresponding to the class may be set as an ROI. Consequently, an AROI 22 is set as illustrated in FIGS. 7 and 8.

Figure 7:
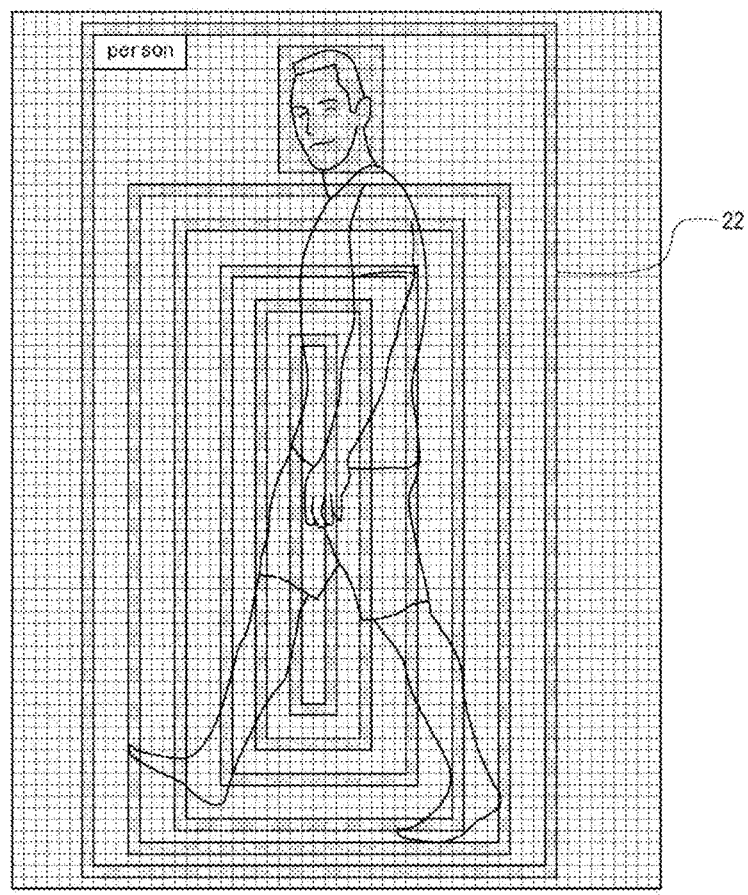
FIG. 7 is a diagram illustrating an advanced ROI (AROI) according to the embodiment.

FIG. 7 illustrates the AROI 22 generated using a template corresponding to a class of a "person" for an image region of a person. A grid in the drawing is pixels, and dark pixels are pixels designated by the AROI.

For example, in the template corresponding to the class of "person", a face part is configured as necessary pixels at high density, and a body part is configured as necessary pixels at low density to cover the entirety.

Figure 8:
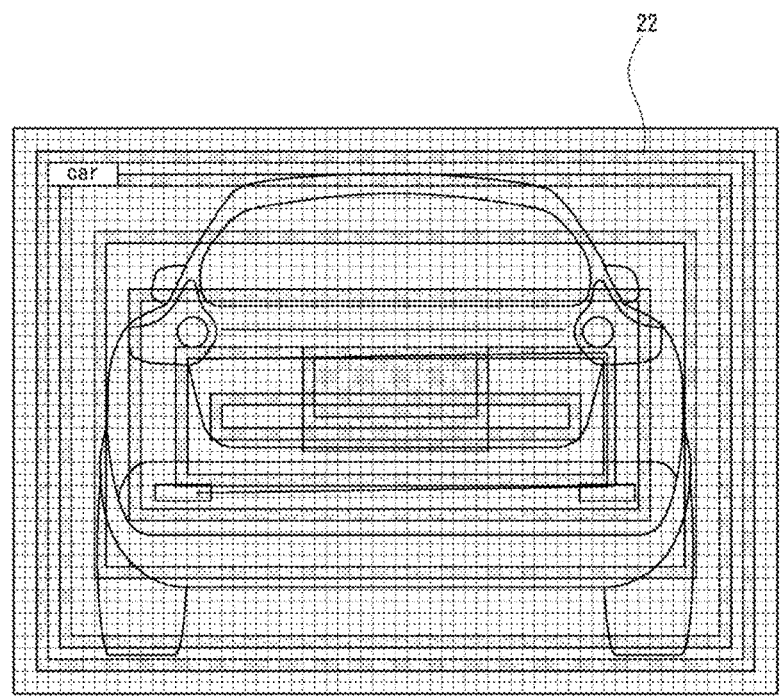
FIG. 8 is a diagram illustrating an advanced ROI according to the embodiment.

In addition, FIG. 8 illustrates the AROI 22 generated using a template corresponding to a class of an "automobile". This example shows adaptation to a rear image of an automobile. For example, a part where a number plate is positioned is configured as necessary pixels at high density, and necessary pixels are arranged at low density in the other parts to be able to cover the entirety. Actually, it is also conceivable that the class of "person" is also subdivided, and a template is subdivided into a "sideways person", a "front-facing person", a "sitting person", and the like, or for the class of "automobile", a template is subdivided into a "side image", a "front image", a "rear image", and the like.

A template is selected in accordance with a class in this manner, and a template is enlarged/reduced in accordance with a region size in the actual frame to generate the AROI 22.

The AROI 22 is generated using a template which is set in accordance with a class, and thus it is possible to obtain information by which object detection can be accurately performed in accordance with a class even when the number of pixels to be subjected to photoelectric conversion is significantly reduced.

[2-5: Area Clipping Using Threshold Value Setting and AROI]

Next, a processing example in which the efficiency of area clipping using the AROI 22 is further improved will be described.

In a case where the AROI 22 using a template is used, parameters are set based on a set threshold value for an object (class), a part, or the like of a detection target. That is, the above-mentioned idea of a threshold value is adopted, a threshold value is determined based on a correct answer rate of object detection which is calculated by a DNN, and parameters are set.

For example, a resolution distribution of a region of interest in the AROI 22 is determined in accordance with a threshold value which is set using a confidence rate.

Figure 9:
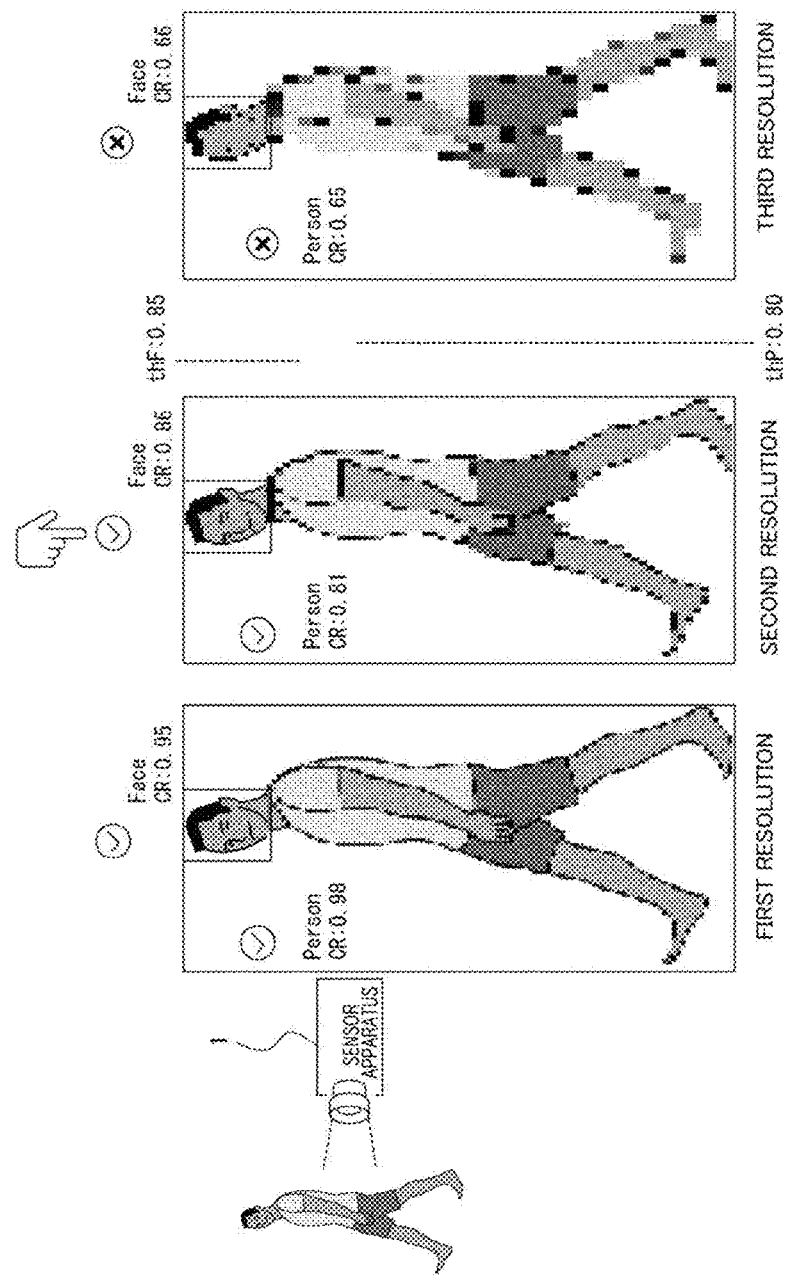
FIG. 9 is a diagram illustrating an advanced ROI and threshold values according to the embodiment.

FIG. 9 schematically illustrates an example. A case where a person is set to be a target class and a case where a face is set to be a target class are conceivable.

It is assumed that a relationship of a first resolution>a second resolution>a third resolution is established.

It is assumed that a confidence rate CR for face detection is 0.95 at the first resolution, 0.86 at the second resolution, and 0.66 at the third resolution.

It is assumed that a confidence rate CR for person (body) detection is 0.98 at the first resolution, 0.81 at the second resolution, and 0.65 at the third resolution.

In a case where a threshold value thF for face detection is set to 0.85, the second resolution is selected as a parameter adapted so that the amount of image data is as small as possible, and image processing is performed on pixels in a template. Further, in a case where a threshold value thP for person detection is set to 0.80, the second resolution is selected as a parameter adapted so that the amount of image data is as small as possible, and image processing is performed on pixels in a template.

In either case, the second resolution is suitable, but in some cases, it is also assumed that the first resolution is set when a threshold value thF for face detection is 0.94, or the third resolution is set when a threshold value thP for person detection is set to 0.60.

That is, in a case where the AROI 22 is used, a threshold value is set for each target class to set parameters such as image processing and reading processing for pixels in the AROI 22.

For the AROI 22, parameter setting corresponding to, for example, a confidence rate is also performed, and parameters such as a resolution are set, thereby making it possible to improve the efficiency of imaging processing and image processing while maintaining the accuracy of object detection.

[2-6: Intelligent Compression]

Intelligent compression is to specify an object to be detected and compress the object with a low compression rate and compress a region other than the object with a high compression rate.

Figure 10:
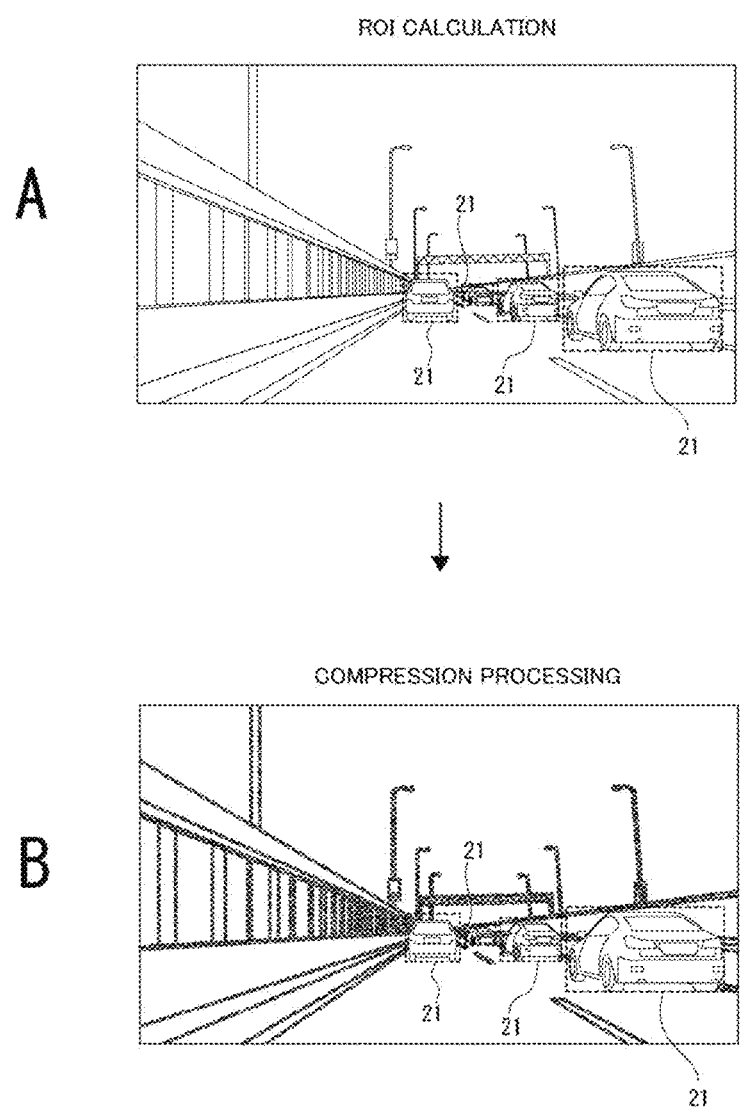
FIG. 10 is a diagram illustrating intelligent compression according to the embodiment.

A specific example is illustrated in FIG. 10.

FIG. 10A illustrates a state where the ROI 21 is generated to correspond to a region of each automobile in a case where the class of "automobile" which is a target class is detected from an image of any one frame.

FIG. 10B illustrates an image signal in which the region of the ROI 21 is compressed with a low compression rate, and the other areas are compressed with a high compression rate.

With such a configuration, the amount of analysis data and the amount of communication data are reduced without degrading the accuracy of object detection targeted by an application of object detection.

In addition, it is also possible to achieve a reduction in power consumption of the sensor apparatus 1 and an increase in the speed of image analysis related to object detection of the entire system having the sensor apparatus 1 mounted thereon.

[2-7: Active Area Clipping]

In the above-described area clipping, an example in which the ROI 21 is set for an object to be detected, and only pixels in the region set as the ROI 21 are read from the array sensor 2 has been described.

Here, description will be given focusing on a case where the region set as the ROI 21 may be concentrated in a specific region in the image.

Figure 11:
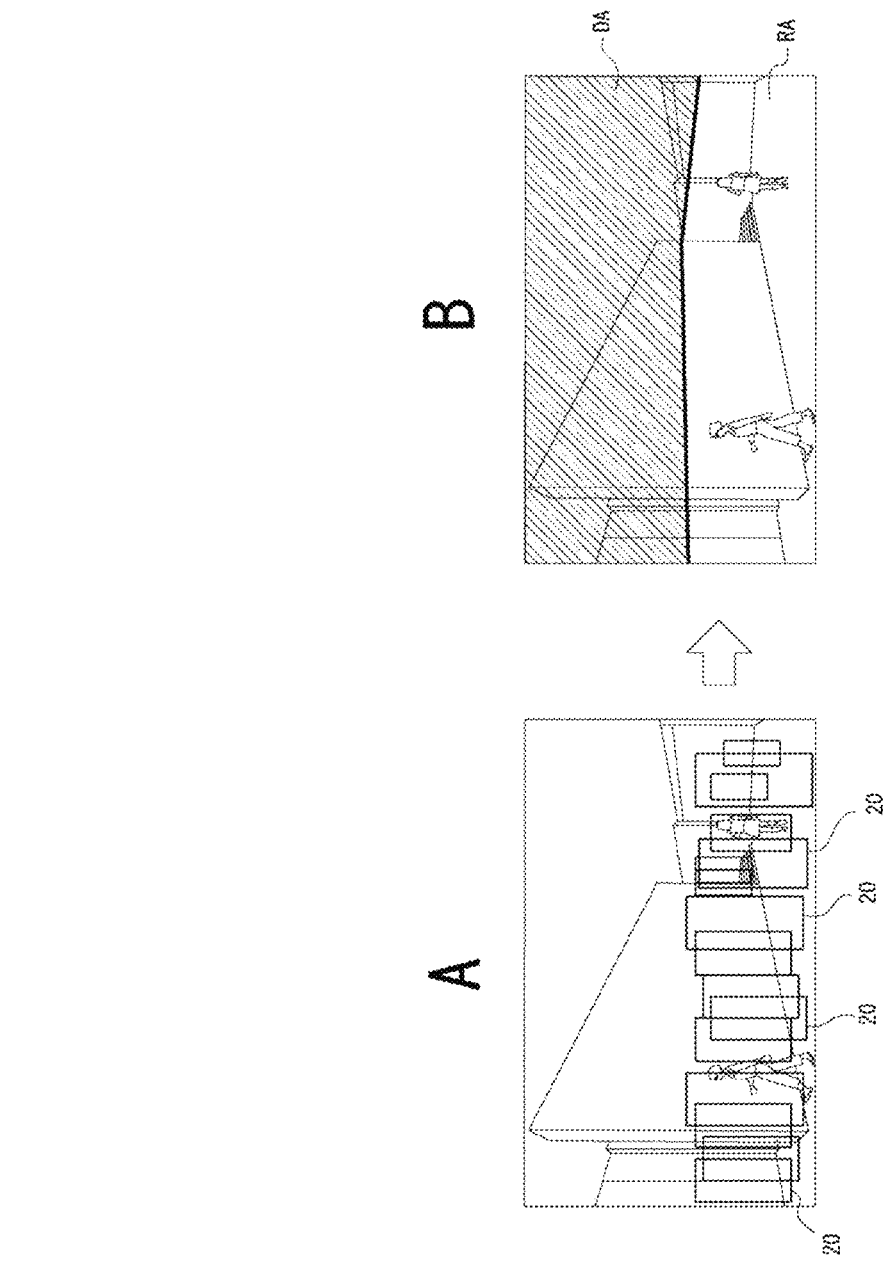
FIG. 11 is a diagram illustrating active area clipping according to the embodiment.

FIG. 11A illustrates an example of an image of a monitoring camera, for example, in a building. It is assumed that an ROI 21 is set using a person as a detection target. In the drawing, a position in an image of a bounding box 20 which is the source of the ROI 21 set within a past predetermined period is illustrated. The bounding box 20 is a region which is set based on the ROI 21. For example, the bounding box 20 is set to be a pixel range obtained by slightly expanding the ROI 21, or the like.

For example, in this case, a setting position of the bounding box 20 (and the ROI 21) is a region close to the floor in the image in the past predetermined period.

In other words, no person appears in a region near the ceiling in the image, and thus it can be said that person detection processing may not be performed in an image region near the ceiling.

Consequently, for example, as illustrated in FIG. 11B, a region where a "person" which is a detection target, that is, a region where the bounding box 20 has been set in the past predetermined period is set to be an active area RA, and a region where a "person" which is a detection target, that is, a region where the bounding box 20 has not been set in the past predetermined period is set to be an inactive area DA.

Figure 12:
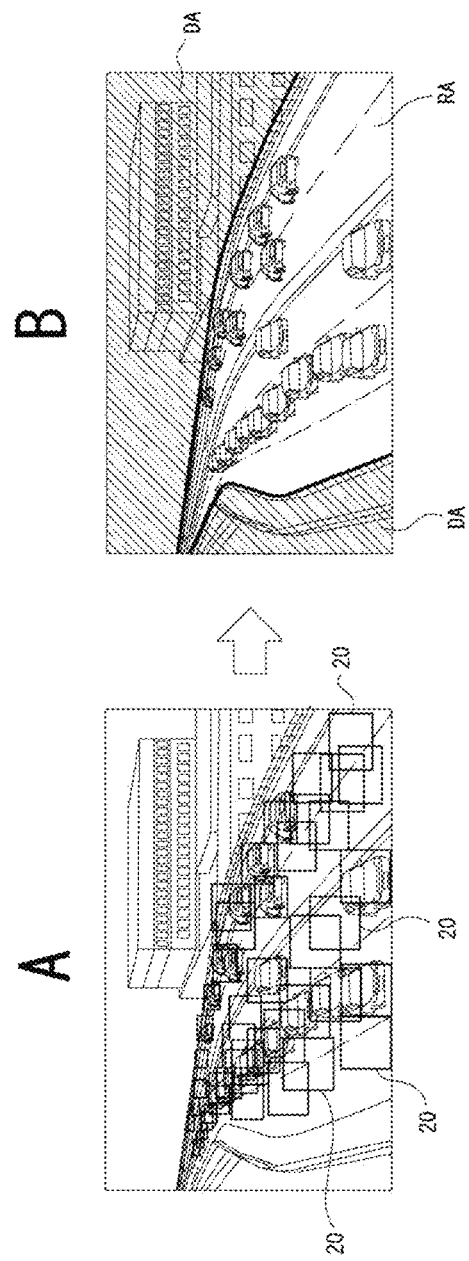
FIG. 12 is a diagram illustrating active area clipping according to the embodiment.

FIG. 12A illustrates an example of an image of, for example, a monitoring camera that monitors a car as a detection target on an expressway and illustrates the position of the bounding box 20 which is set in a past predetermined period.

Also in this case, the car appears near a road surface, and thus an active area RA and an inactive area DA can be set as illustrated in FIG. 12B.

The active area RA is set as in the above-described examples of FIG. 11B and FIG. 12B, and an object is detected from a detected signal in the active area RA in the imaging pixel by the array sensor 2. In addition, an instruction for the ROI 21 generated based on the detection of the object is given to the signal processing unit 30 as a region related to the acquisition of a detected signal or signal processing of a detected signal, similarly to the above-described area clipping processing.

That is, for an object detection key frame, object detection is performed by partially performing photoelectric conversion based on history information of object detection instead of full-screen scanning.

Note that the object detection key frame is a frame in which information is acquired in all valid pixel regions of the array sensor 2 for object detection in the area clipping processing. The acquisition of information in only a pixel area of the active area RA in this key frame is active area clipping processing.

When the active area clipping processing is applied, object detection of the arithmetic operation unit 8 can be performed in only the active area RA instead of all effective pixel regions of one frame. In addition, the active area RA is a region in which object detection of a target class can be performed. In other words, a region other than the active area RA in which object detection of a target class is almost impossible.

Thus, it is possible to improve the efficiency of processing, reduce power consumption, and the like by reducing the number of read pixels of an object detection key frame and reducing a detection range.

[2-8: Active Sampling]

Active sampling indicates processing for dynamically changing a frame rate according to the presence or absence of an object. It can be said that it is compression of the amount of data in a time axis direction corresponding to the presence or absence of an object. In addition, it is also possible to achieve a reduction in power consumption of the sensor apparatus 1.

Figure 13:
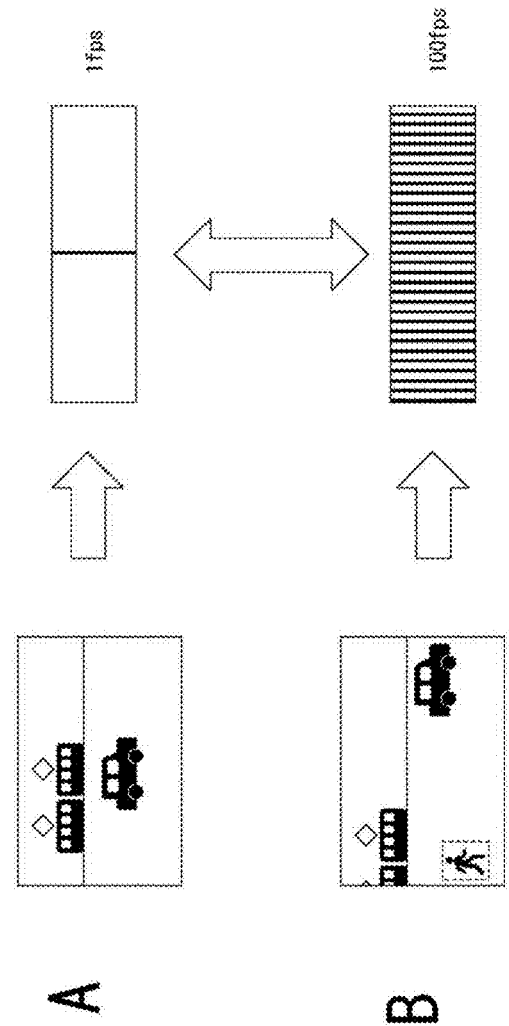
FIG. 13 is a diagram illustrating active sampling according to the embodiment.

Active sampling will be described using FIG. 13.

Now, a person is detected from a captured image by setting a target class to be a "person". For example, a case where the outside of a building is imaged by a monitoring camera through an entrance is assumed.

FIG. 13A illustrates a state where a person is not included in a captured image. In such a case, a frame rate is set to be a low rate, for example, 1 fps.

FIG. 13B illustrates a state where a person is detected in a captured image. In such a case, a frame rate is changed to a high rate, for example, 100 fps.

That is, a frame rate is dynamically changed by limiting a detection target to decrease the frame rate in a particularly unnecessary case (when no person is detected) and increase the frame rate and make the amount of information dense in a necessary case (when a person is detected).

In a case where such active sampling is performed, the arithmetic operation unit 8 (key frame selection unit 81) sets moving image capture for the ADC/pixel selector 3, for example, in accordance with the setting of an idling mode stored in the arithmetic operation unit 8 in advance.

For example, the setting of an idling mode and the setting of a normal mode are stored in the parameter selection unit 84 in the arithmetic operation unit 8.

The active sampling is provided with an idling mode and a normal mode, and the idling mode is a mode before it is confirmed that an object of a target class is in an imaging screen.

In the idling mode, a moving image is captured at a frame rate lower than that in the normal mode.

It is conceivable that the idling mode be started in response to a command received from the outside of the sensor apparatus 1. In addition, the idling mode may respond to a command at a data acquisition timing interval for an idling mode which is received from the outside of the sensor apparatus 1. For example, in a case where an instruction of 60 sec has been given, an object detection key frame recording timing is set at intervals of 60 sec.

The normal mode is a normal moving image capture mode. For example, the normal mode responds to a command at a data acquisition timing interval for a normal mode which is received from the outside of the sensor apparatus 1.

In the normal mode, a moving image is normally captured at a frame rate higher than that in an idling mode, and the normal mode is a mode in which imaging is performed at intervals of 0.01 sec (100 fps) in a case where an instruction of, for example, 0.01 sec has been given.

Thus, the arithmetic operation unit 8 gives an instruction for an idling mode to the ADC/pixel selector 3, and thus a moving image is captured at intervals of, for example, 1 sec when an idling mode is set at 1 fsp.

Note that the setting of an idling mode and the setting of a normal mode are not necessarily stored in the arithmetic operation unit 8, but may be stored in the external memory of the arithmetic operation unit 8.

Naturally, the frame rates in the idling mode and the normal mode are examples of a frame rate.

The arithmetic operation unit 8 (object region recognition unit 82) detects a position which is a candidate for an object in the acquired image.

The arithmetic operation unit 8 (class identification unit 83) performs class classification of the object detected as a candidate.

In addition, the arithmetic operation unit 8 confirms whether or not there is a target class in the class obtained as a result of the class identification.

When there is no target class, the arithmetic operation unit 8 acquires an image of the next frame in an idling mode, and similarly detects a position being a candidate for an object and performs class identification. In this case, for example, when imaging is performed at 1 fps, these processes are performed on an image after 1 second.

For example, in a case where a "person" is set to be a target class and a "person" is present as an identified class, the arithmetic operation unit 8 sets moving image capture in the ADC/pixel selector 3 in accordance with the setting of a normal mode stored, and instructs the ADC/pixel selector 3 to perform imaging in a normal mode.

Thus, when the setting of a normal mode is 100 fsp, moving image capture is performed at intervals of, for example, 0.01 sec.

The arithmetic operation unit 8 performs object detection processing in a state where the mode is switched to a normal mode in this manner.

In addition, the normal mode continues as long as there is a target class in the captured image, while the mode is switched to an idling mode when there is no target class.

When the processing of active sampling is performed in this manner, data amount compression is performed by reducing a frame rate particularly in a period for which there is no target class, and thus power consumption is reduced.

Note that the arithmetic operation unit 8 makes a frame rate variable by instructing the ADC/pixel selector 3 to change a frame rate, but the arithmetic operation unit 8 may instruct the logic unit 5 to change a frame rate.

For example, reading from the array sensor 2 is performed at 100 fps at all times, and the logic unit 5 is instructed to perform frame thinning in the case of an idling mode. Thereby, it is possible to reduce the amount of data related to transmission to the processor 11.

[2-9: Active Sampling Through Threshold Value Setting]

Description will be given of an example in which a method of determining a time resolution based on a correct answer rate of object detection which is calculated by a DNN is added to the above-described active sampling method.

That is, processing for dynamically changing a frame rate based on an average movement amount of a target class per unit time is performed.

A normal mode and an idling mode are prepared and switched between in the above-described active sampling, but in addition to this processing, a frame rate in a normal mode is set in accordance with a target class.

FIG. 14A illustrates an example of an image in a case where the sensor apparatus 1 is used in a monitoring camera that captures an image of a state on an expressway. A bounding box 20 is illustrated when a target class is a car. A dashed arrow indicates a moving direction of a certain car.

FIG. 14B illustrates the amount of movement of an imaged car as changes in the position of the bounding box 20 (the position of a pixel) on an image in a continuous frame. When considering such an amount of movement of a large number of cars, it is assumed that an average movement amount is 1152 pixels/second.

In this case, it is assumed that a sampling rate capable of maintaining object tracking (tracking of an object on a continuous frame image) is calculated as 46 fps (FIG. 14C).

Next, FIG. 15A illustrates an example of an image in a case where the sensor apparatus 1 is used in a monitoring camera in a building. A bounding box 20 is illustrated when a target class is a person. An arrow indicates a moving direction of a certain person.

FIG. 15B illustrates the amount of movement of an imaged person as changes in the position of the bounding box 20 (the position of a pixel) on an image in a continuous frame. When considering such an amount of movement of a large number of persons, it is assumed that an average movement amount is 192 pixels/second.

In this case, it is assumed that a frame rate capable of maintaining object tracking is calculated as 5 fps (FIG. 15C).

For example, as described above, a frame rate capable of maintaining object tracking in a case where a target class is a car is different from that in a case where a target class is a person.

Then, when a frame rate capable of maintaining object tracking is obtained by a DNN in accordance with a target class, and a threshold value thereof (a lower limit of a frame rate allowed) is obtained, it is possible to maintain the accuracy of object detection while tracking an object and keeping the amount of data as small as possible.

Note that a frame rate is determined by setting a read timing of the array sensor 2 and setting a sampling rate of the ADC/pixel selector 3.

In this case, the arithmetic operation unit 8 calculates a threshold value (a frame rate which is a threshold value) capable of maintaining object tracking while changing a frame rate for a target class at the time of object detection.

Thereafter, in the arithmetic operation unit 8, the calculated threshold value, the target class, and information of a threshold value calculation policy used for the calculation of a threshold value are recorded in association with each other. For example, these are recorded in a recording region inside the arithmetic operation unit 8, recorded in a predetermined region of the memory 6, or transferred to the processor 11 and recorded therein.

Thereby, for example, a parameter based on a threshold value corresponding to a target class, that is, the value of a frame rate as low as possible at a frame rate capable of maintaining object tracking is set. That is, it is possible to set a frame rate in a normal mode corresponding to a target class. Then, processing of the above-described active sampling is performed.

When the processing of active sampling is performed as described above, data amount compression is performed by reducing a frame rate in a period for which there is no target class, and thus power consumption is reduced.

In addition, even when a normal mode is set, processing is performed at a frame rate adapted in accordance with a target class, and thus a significantly low frame rate (5 fps described above, or the like) is set depending on a class. Thus, data amount compression and a reduction in power consumption are performed even in a normal mode.

3. Outline of Operation Based on Input and Output Information

As described in FIG. 2, the sensor apparatus 1 inputs and outputs various information to and from the device-side processing unit 50 (for example, the processor 11). Hereinafter, processing for inputting and outputting information between the sensor apparatus 1 and the processor 11 will be described.

First, processing in which the sensor apparatus 1 inputs device information will be described.

Examples of the device information include power supply information, communication status information, hardware/application information, and the like of the device 100.

The following processing is conceivable as the processing of the sensor apparatus 1 based on these information.

For example, in a case where power supply information indicating that the device 100 has a small battery residual capacity has been received from the processor 11, the arithmetic operation unit of the sensor apparatus 1 performs, for example, the following processing.

In the above-described processing of "Image adaptation through threshold value setting", threshold value setting is performed by decreasing a confidence rate to adjust parameters.

A frame rate in the above-described "active sampling" is decreased.

These are examples, and when the sensor apparatus 1 consuming the same battery in the device 100 performs processing for reducing power consumption, the accuracy of object detection may be slightly reduced, but an operation time of the device 100 can be extended.

Further, for example, in a case where communication status information indicating that a communication situation is bad has been received from the processor 11, the arithmetic operation unit of the sensor apparatus 1 performs, for example, the following processing.

A frame rate of a captured image is decreased.

A compression rate of the captured image is increased.

A resolution of the captured image is decreased.

These are examples, and in a case where the device 100 transmits image data captured by the sensor apparatus 1 to the outside, it may be effective to reduce the amount of data due to deterioration of a communication situation. In addition, a decrease in a frame rate, and the like also lead to a reduction in the power consumption of the sensor apparatus 1 and can also prevent the device 100 from unnecessarily consuming energy by performing optimal streaming based on a communication situation.

Further, for example, information indicating a situation where a processing load is large has been received from the processor 11, the arithmetic operation unit of the sensor apparatus 1 performs, for example, the following processing.

A resolution of a captured image is decreased.

Switching is performed from a state where normal image imaging processing is performed to a state where any one or two or more of "classification image adaptation", "image adaptation through threshold value setting", "area clipping", "area clipping using AROI", "area clipping using threshold value setting and AROI", "intelligent compression", "active area clipping", "active sampling", and "active sampling through threshold value setting" are executed. Alternatively, these are selectively switched between rather than performing them.

These are examples, and when the sensor apparatus 1 activates processing capable of reducing a load of the processor 11, it is also possible to reduce the amount of calculation of the device 100 as a whole and promote smooth processing.

As in the above-described examples, the sensor apparatus 1 performs adaptive processing corresponding to the state of the device, and thus advantageous processing is performed for the sensor apparatus 1 itself and the device 100 as a whole.

Specific examples of device information are listed below.

For example, there is the following information as power supply information which is one of the device information.

Battery residual capacity

Battery voltage

Battery temperature

For example, there is the following information as communication status information which is one of the device information.

Connection method a. Gateway/LAN/WAN b. WiFi (registered trademark)

c. Bluetooth (registered trademark)/beacon d. Cellular (registered trademark)

e. Satellite f. Ethernet (registered trademark)

g. Low power wide area (LPWA) communication

Effective throughput

Whether or not connection can be performed

Regarding hardware/application information which is one of the device information, first, there is, for example, the following information as information related to hardware.

Presence or absence of MCU

MCU performance (Floating point Operation per Second: FROPS)

Temperature in equipment
Other sensor information
Memory size
Device type
a. Drone
b. Robot
c. Camera pantilter
d. Wearable device
e. Others
Device name, device ID
Distinction between fixed device and mobile device
Distinction between active state and standby state For example, there is the following information as information on an application in the hardware/application information.

Target class corresponding to application
Metadata (attribute feature amount, individual feature amount, flow line data, and the like) desired to be received from sensor apparatus 1

Detailed examples for the metadata are as follows.

First, the attribute feature amount and the individual feature amount include data of feature amounts of an attribute and an individual for each ID number.

The ID number is automatically numbered by the sensor apparatus 1 for each target individual designated by an ID genre. Note that the ID number is a code written in a number, an alphabet, and a symbol by which a genre and an individual can be identified.

An attribute feature amount for each ID is data representing a target attribute of a genre and is estimated by the sensor apparatus 1.

For example, the following examples are assumed as a genre name and an attribute feature amount.

Height, gender, age, and the like as attribute feature amounts for genre name "person"
Color, types such as ordinary car/large car/bus, and the like as attribute feature amounts for genre name "car"
Type of part as attribute feature amount for genre name "part"

An individual feature amount for each ID is data in which a feature capable of recognizing an individual of an ID is coded, and is calculated by the sensor apparatus 1.

For example, the following examples are assumed as a genre name and an individual feature amount.

As individual feature amount for genre name "person", feature amount in which movement such as appearance characteristic (clothing characteristic, presence or absence of glasses) or walking style of person is coded
As individual feature amount for genre name "car", number, type of car, the number of passengers, or appearance feature amount
As individual feature amount for genre name "part", number, barcode, or the like printed on part Flow line data as the metadata incudes an ID number for each time (an interval can be freely set) and the position (coordinate information) of an ID in a screen.

Next, the output of sensor operation information by the sensor apparatus 1 will be described.

For example, information such as a confidence rate, a class, and an object area of object detection and information such as a frame rate, a processing parameter, an image quality parameter, and a resolution are sequentially transmitted to the processor 11. In this case, the following examples are conceivable.

For example, in the case of the movable device 100 such as the self-propelled robot 101 or the flight vehicle 102, the sensor apparatus 1 transmits sensor operation information indicating a situation where an object to be detected is small in an image and a confidence rate cannot be increased to the processor 11.

Specifically, the arithmetic operation unit 8 detects a situation where a target is far from the value of a confidence rate and information (the number of pixels of a target, and the like) of an object area of a target class by the function of the operation information generation unit 87, and generates and transmits sensor operation information indicating the above-described situation. Alternatively, the value of a confidence rate and the information of the object area of the target class may be transmitted as sensor operation information, and the processor 11 may determine the situation.

In response to this, the processor 11 can control a device operation so as to approach a target object, for example. As a result, a confidence rate of the target object is improved.

In addition, the arithmetic operation unit 8 transmits sensor operation information indicating a situation where the brightness of an image is low and the confidence rate of the target object is not increased to the processor 11.

Specifically, the arithmetic operation unit 8 detects a situation where the accuracy of detection is decreased due to a dark place from an average brightness of the captured image and the value of the confidence rate, and generates and transmits sensor operation information indicating the situation. Alternatively, the value of the confidence rate, the average brightness value, and the like may be transmitted as sensor operation information, and the processor 11 may determine the situation.

In response to this, the processor 11 controls a device operation so as to turn on a lighting, for example. As a result, the confidence rate of the target object is improved.

In addition, the arithmetic operation unit 8 transmits sensor operation information indicating a situation where a target object is not in an image to the processor 11. Specifically, the arithmetic operation unit 8 generates and transmits sensor operation information indicating the situation from a fact that a state where an object of a target class cannot be detected continues, and the like. Alternatively, information indicating that a target class cannot be detected may be continuously transmitted as sensor operation information, and the processor 11 may determine the situation.

For example, in the case of the device 100 as the monitoring camera 104, the processor 11 controls a device operation, for example, so as to pan or tilt an imaging direction in response to this. As a result, a target object may be able to be detected. In other words, an appropriate operation can be adaptively executed as a monitoring operation.

In addition, the arithmetic operation unit 8 transmits sensor operation information indicating a situation where a target object moves to the left in an image and disappears from a screen to the processor 11. Specifically, the arithmetic operation unit 8 detects a moving direction from an object area of an object of a target class at each timing, and generates and transmits sensor operation information indicating the state due to a fact that the object cannot be detected, or the like. Alternatively, information on an object area at each timing and information indicating that a target class cannot be detected may be continuously transmitted as sensor operation information, and the processor 11 may determine the situation.

For example, in the case of the device 100 as the monitoring camera 104, the processor 11 controls a device operation, for example, so as to pan an imaging direction to the left in response to this. As a result, a target object may be able to be imaged again and detected. It can be said that an appropriate tracking operation can be executed as a monitoring operation.

As in the above-described examples, the sensor apparatus 1 transmits sensor operation information to the processor 11 to obtain a state suitable for sensing of the sensor apparatus 1 or obtain advantageous results for the device 100 as a whole.

Specific examples of the sensor operation information are as follows.

Object detection information: for example, confidence rate, class, object area, and the like
Frame rate (frames per second: FPS)
Image quality parameter Incidentally, in order for the sensor apparatus 1 to perform processing corresponding to device information and transmit sensor operation information as described above and execute processing corresponding to the situation of the device 100, it is required that information of the device 100 mounted in advance and conditions for determining operation switching are registered.

Consequently, in the sensor apparatus 1, hardware/application information and switching condition information are registered in, for example, the memory 6 or the like for mainly processing of the switching determination unit 86 and the operation information generation unit 87 of the arithmetic operation unit 8.

Although an example of accommodation of hardware/application information has been described above, when the hardware/application information is registered, the operation information generation unit 87 of the sensor apparatus 1 can generate necessary or appropriate sensor operation information in accordance with the device 100 and transmit the generated sensor operation information to, for example, the processor 11.

In addition, when the switching condition information is registered, the switching determination unit 86 can appropriately execute operation switching control of the sensor apparatus 1 in accordance with device information.

An example of switching condition information will be described. The state of operation setting of each of the following "first operation setting" to "eleventh operation setting" will be described.

Regarding battery residual capacity
Less than 20%: first operation setting
20% or more and less than 90%: second operation setting
90% or more: third operation setting
Regarding battery voltage
Less than 3.2 V: fourth operation setting
3.2 V or more: fifth operation setting
Regarding battery temperature
Less than 10° C.: sixth operation setting
10° C. or more: seventh operation setting
Communication method
In case of WiFi: eighth operation setting
In case of Bluetooth: ninth operation setting
Regarding effective throughput
Less than 800 Mbps: tenth operation setting
800 Mbps or more: eleventh operation setting For example, switching conditions for operation setting are registered in this manner, and thus the sensor apparatus 1 can independently switch operation setting in accordance with the type, operational purpose, and the like of the device 100.

4. Processing Example

Hereinafter, a processing example of the arithmetic operation unit 8 of the sensor apparatus 1, particularly, a processing example based on the functions of the switching determination unit 86 and the operation information generation unit 87 will be described.

[4-1: First Processing Example]

Figure 16:
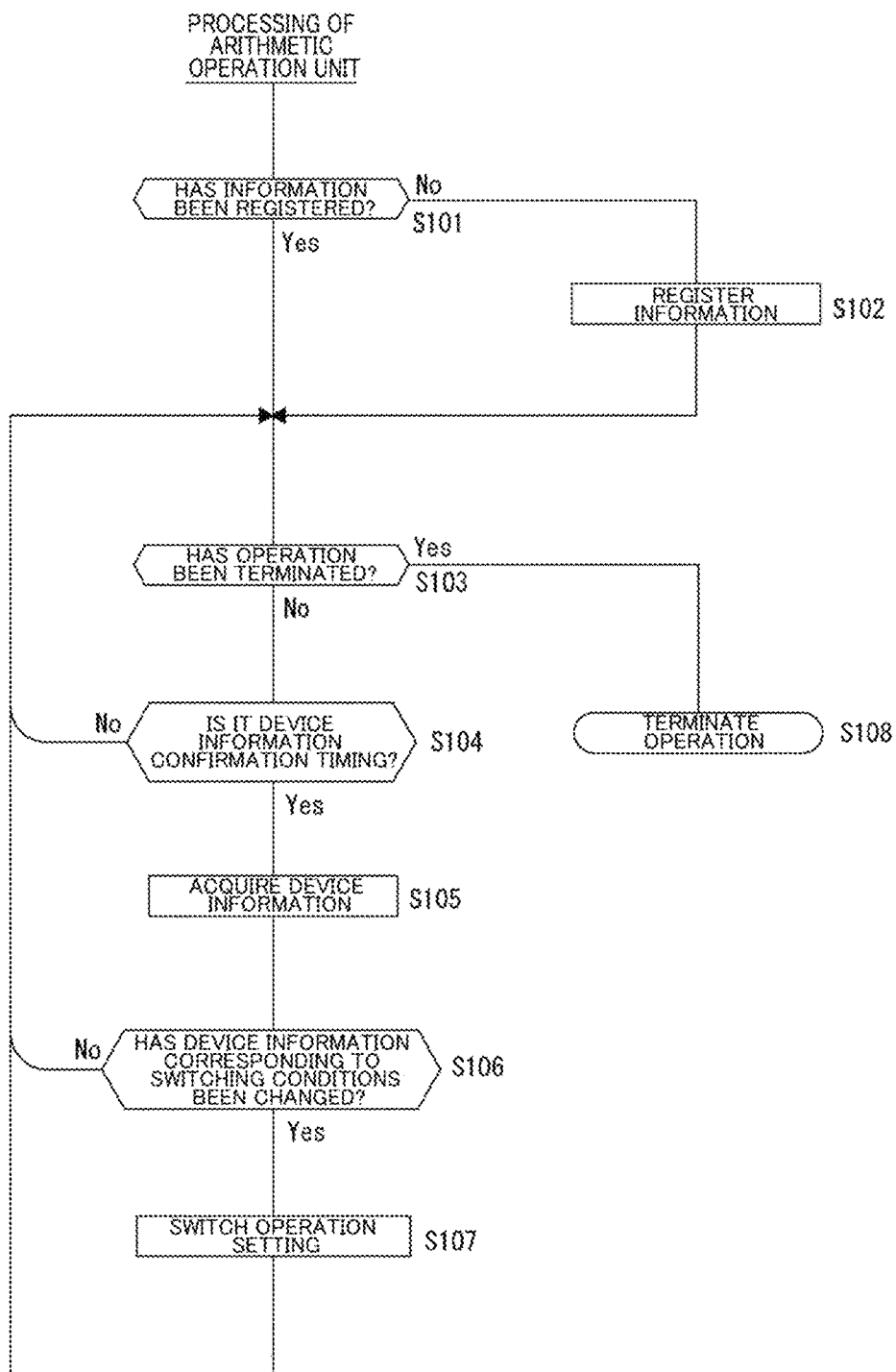
FIG. 16 is a flowchart illustrating a first processing example according to the embodiment.

FIG. 16 illustrates a flowchart of processing of the arithmetic operation unit 8 as a first processing example. This is a processing example in which the arithmetic operation unit 8 executes processing using the function of the switching determination unit 86 in accordance with the device 100 to be input.

In step S101, the arithmetic operation unit 8 confirms whether or not necessary information has been registered. The necessary information mentioned herein is, for example, the above-described registration information and is, for example, hardware/application information and switching condition information.

When necessary information has not been registered, the arithmetic operation unit 8 proceeds to step S102 and executes information registration processing.

For example, the arithmetic operation unit 8 communicates with the processor 11 to acquire and register necessary information. Regarding the switching condition information, for example, a default setting value may be registered.

Note that the switching condition information may be updated in accordance with a user's operation, temporal determination of the arithmetic operation unit 8, or the like.

When information has been registered, the process of step S103 and the subsequent processes are performed.

In step S103, the arithmetic operation unit 8 determines whether or not it is an operation termination timing of the sensor apparatus 1. For example, in a case where the power supply of the device 100 itself is turned off or in a case where an instruction for turning off the operation of the sensor apparatus 1 has been given from the processor 11 of the device 100 for some reason, the processing is terminated in step S108.

While the operation is being continued, the arithmetic operation unit 8 proceeds to step S104 and determines whether or not it is a timing for confirming device information. For example, this is to periodically acquire device information from the processor 11.

Note that, even when the processor 11 is not particularly synchronized with the arithmetic operation unit 8, the processor 11 can transmit device information at an asynchronous timing and store the device information in a predetermined region of the memory 6.

When it is not a confirmation timing, the arithmetic operation unit 8 returns to step S103.

The arithmetic operation unit 8 proceeds to step S105 at every confirmation timing to confirm the memory 6 and can acquire device information.

Note that the device information mentioned herein is information that fluctuates sequentially, such as power supply information or communication status information. Although the hardware/application information is mainly registration information acquired in step S122, the hardware/application information may be included in information acquired in step S105 as long as there is information that fluctuates sequentially as hardware and application information.

Note that a processing mode may be adopted in which the arithmetic operation unit 8 requests the processor 11 to transmit device information when it is a confirmation timing, and the processor 11 transmits the device information accordingly.

In a case where device information has been acquired, the arithmetic operation unit 8 determines in step S106 whether or not device information corresponding to switching conditions has been changed.

For example, as an example of the above-described battery residual capacity, when the battery residual capacity was 91% last time and 88% this time, it is determined that a change corresponding to the switching conditions has been made.

When a change corresponding to the switching conditions has not been made, the arithmetic operation unit 8 returns to step S103.

In a case where a change corresponding to the switching conditions has been made, the arithmetic operation unit 8 proceeds to step S107 and performs control for switching operation setting.

For example, adaptive control such as a decrease in a threshold value corresponding to a confidence rate or a decrease in a frame rate is executed.

[4-2: Second Processing Example]

Figure 17:
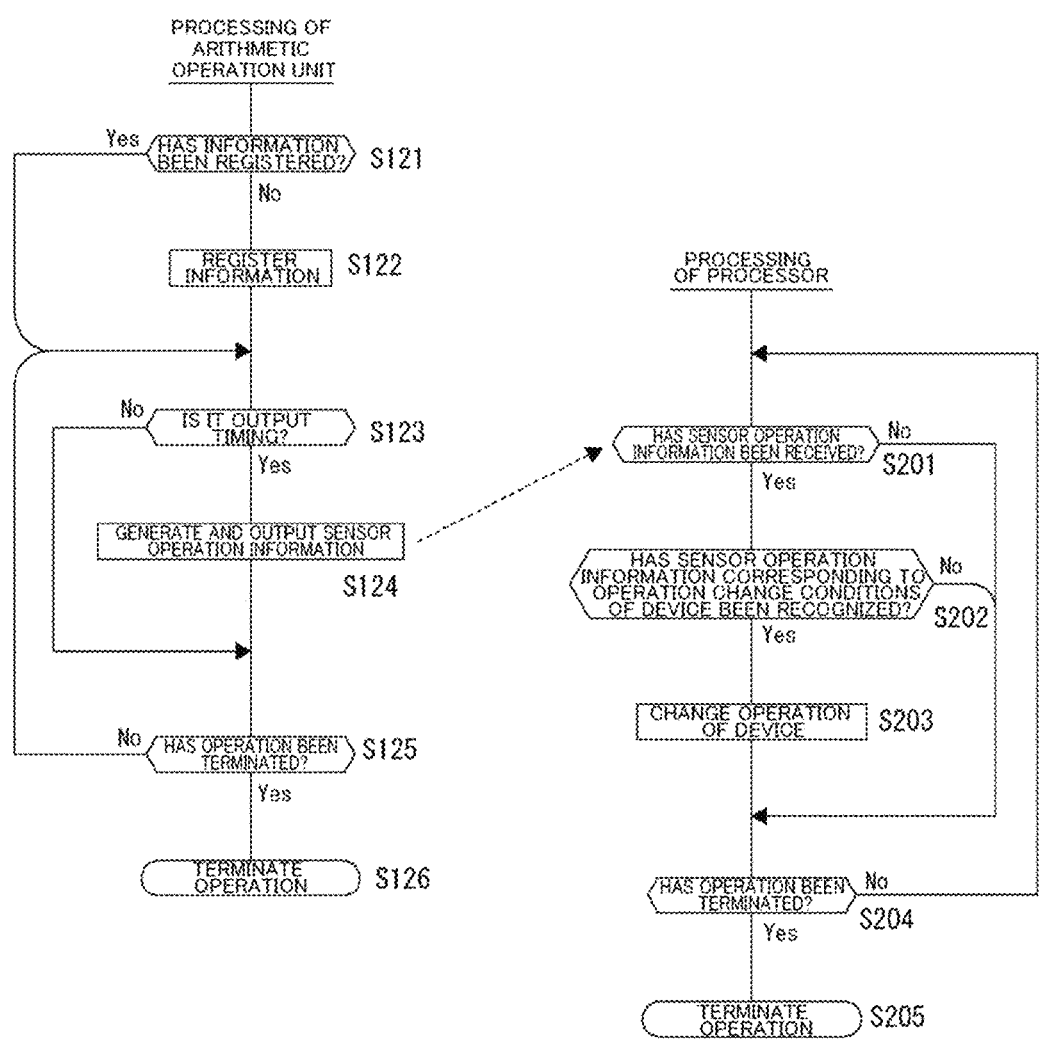
FIG. 17 is a flowchart illustrating a second processing example according to the embodiment.

As a second processing example in FIG. 17, the processing of the arithmetic operation unit 8 and the processing of the processor 11 are described. This is an example in which the arithmetic operation unit 8 outputs sensor operation information using the function of the operation information generation unit 87, and the processor 11 controls a device operation accordingly.

In step S121, the arithmetic operation unit 8 confirms whether or not necessary information has been registered. The necessary information in this case is, for example, hardware/application information in the above-described registration information.

When necessary information has not been registered, the arithmetic operation unit 8 proceeds to step S122 and executes information registration processing.

For example, the arithmetic operation unit 8 communicates with the processor 11 to acquire and register necessary information for hardware and an application of the device 100.

When information has been registered, the process of step S123 and the subsequent processes are performed.

In step S123, the arithmetic operation unit 8 determines whether or not it is a timing when sensor operation information is output. For example, when sensor operation information is output periodically, the timing is waited for.

When it is an output timing, the arithmetic operation unit 8 proceeds to step S124 to generate sensor operation information and output the generated sensor operation information to the processor 11.

In step S125, the arithmetic operation unit 8 determines whether or not it is an operation termination timing of the sensor apparatus 1. For example, in a case where the power supply of the device 100 itself is turned off or in a case where an instruction for turning off the operation of the sensor apparatus 1 has been given from the processor 11 of the device 100 for some reason, the processing is terminated in step S126.

During a period in which the operation continues, the arithmetic operation unit 8 returns to step S123. Thus, for example, sensor operation information is periodically transmitted to the processor 11.

The processor 11 waits for the reception of sensor operation information in step S201.

In addition, the generation of an operation termination trigger is monitored in step S204. In a case where a trigger for turning off the power supply has been generated, processing for turning off the power supply is performed in step S205 to terminate the operation.

During an operation period, the processor 11 proceeds to step S202 every time sensor operation information is received, and determines whether or not sensor operation information corresponding to operation change conditions of the device 100 has been recognized. For example, the processor 11 determines whether a request for movement, panning, or the like has been made, whether an operation state of the sensor apparatus 1 in which it is estimated that movement, panning, or the like is required has been observed, or the like as sensor operation information, and determines whether or not an operation is required to be changed.

Further, in a case whether it is determined that an operation is required to be changed, the processor 11 proceeds to step S203 to perform operation control of the device 100. For example, a self-propelled actuator is controlled to execute predetermined movement or execute panning/tilting.

[4-3: Third Processing Example]

Figure 18:
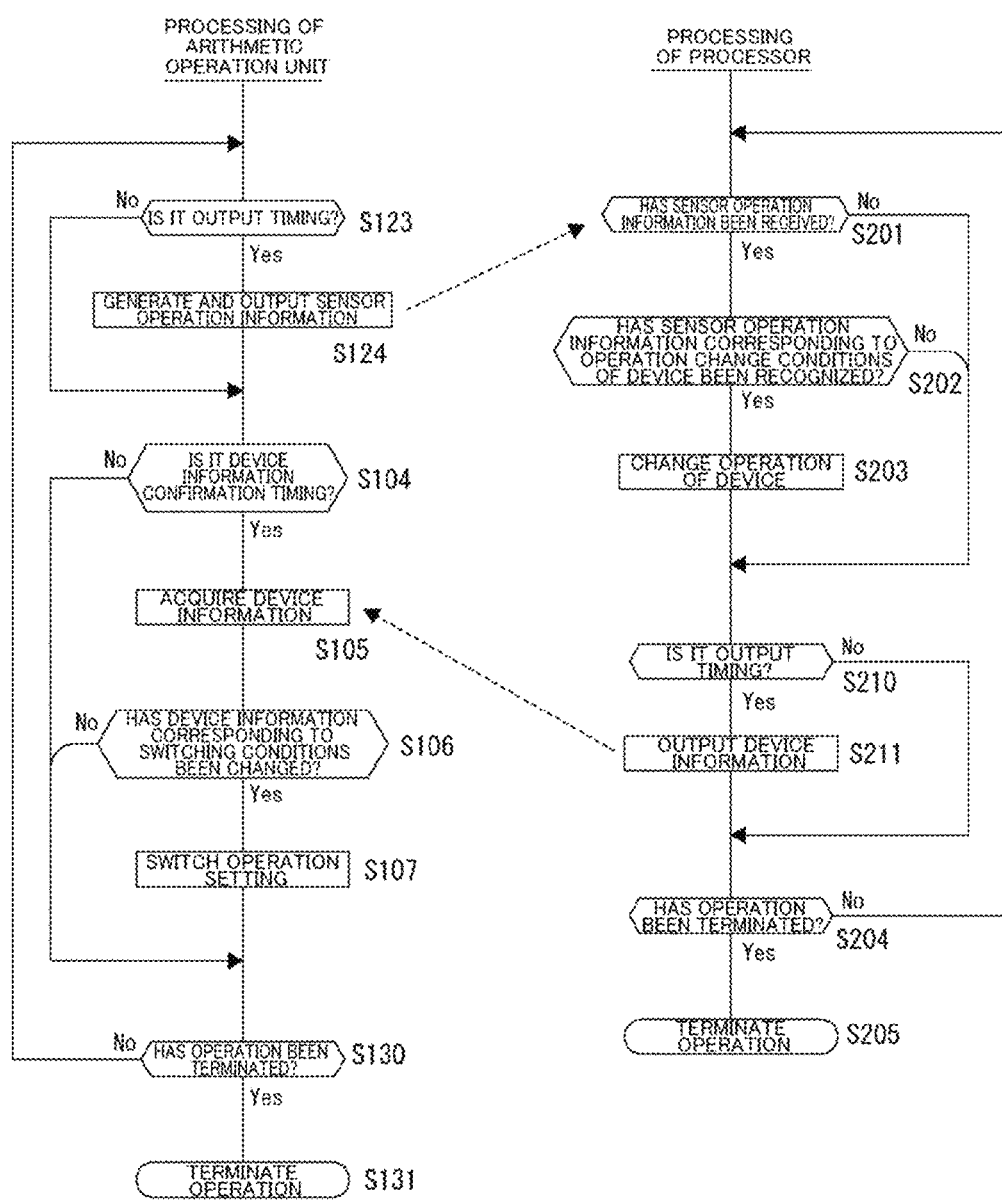
FIG. 18 is a flowchart illustrating a third processing example according to the embodiment.

Also in a third processing example in FIG. 18, the processing of the arithmetic operation unit 8 and the processing of the processor 11 are described. This is an example in which the arithmetic operation unit 8 performs switching control using the function of the switching determination unit 86 and outputs sensor operation information using the function of the operation information generation unit 87, and the processor 11 controls a device operation accordingly. That is, the third processing example is a processing example in which the first and second processing examples are combined. The same processes as those in FIGS. 16 and 17 are denoted by the same step numbers. In addition, assuming that registration information has been registered in the sensor apparatus 1, the subsequent processes are described.

The arithmetic operation unit 8 determines in step S123 whether or not it is a timing when sensor operation information is output.

When it is not an output timing, the arithmetic operation unit 8 proceeds to step S104.

When it is an output timing, the arithmetic operation unit 8 proceeds to step S124 to generate sensor operation information and output the generated sensor operation information to the processor 11. Then, the arithmetic operation unit 8 proceeds to step S104.

In step S104, the arithmetic operation unit 8 determines whether or not it is a timing for confirming device information. When it is not a confirmation timing, the arithmetic operation unit 8 proceeds to step S130.

The arithmetic operation unit 8 proceeds from step S104 to step S105 at every confirmation timing to acquire device information.

In a case where the arithmetic operation unit 8 has acquired device information, the arithmetic operation unit 8 determines in step S106 whether or not device information corresponding to switching conditions has been changed.

When device information corresponding to switching conditions has not been changed, the arithmetic operation unit 8 proceeds to step S130.

In a case where device information corresponding to switching conditions has been changed, the arithmetic operation unit 8 proceeds to step S107 and performs control for switching operation setting.

In step S130, the arithmetic operation unit 8 determines whether or not it is an operation termination timing of the sensor apparatus 1. In a case where it is an operation termination timing, the processing is terminated in step S131.

During a period in which the operation continues, the arithmetic operation unit 8 returns to step S123.

The processor 11 waits for the reception of sensor operation information in step S201. When sensor operation information has not been received, the processor 11 proceeds to step S210.

The processor 11 proceeds to step S202 every time sensor operation information is received, and determines whether or not sensor operation information corresponding to operation change conditions of the device 100 has been recognized.

In a case where it is determined that an operation is not required to be changed, the processor 11 proceeds to step S210.

On the other hand, in a case where it is determined that an operation is required to be changed, the processor 11 proceeds to step S203 and performs operation control of the device 100. For example, a self-propelled actuator is controlled to execute predetermined movement or execute panning/tilting. Then, the processor 11 proceeds to step S210.

In step S210, the processor 11 confirms whether or not it is a timing when device information is output. When it is not an output timing, the processor 11 proceeds to step S204.

When it is an output timing, the processor 11 proceeds to step S211 and outputs device information. In particular, the processor 11 transmits information that fluctuates sequentially, such as power supply information or communication status information.

In step S204, the processor 11 monitors the generation of an operation termination trigger. In a case where a trigger for turning off the power supply has been generated, processing for turning off the power supply is performed in step S205 to terminate the operation.

As in the above-described first, second, and third processing examples, the sensor apparatus 1 and the processor 11 respectively transmit and receive device information and sensor operation information to thereby execute adaptive processing.

5. Another Configuration Example of Sensor Apparatus

A configuration example of the sensor apparatus 1 is not limited to FIG. 3, and other examples are conceivable.

Figure 19:
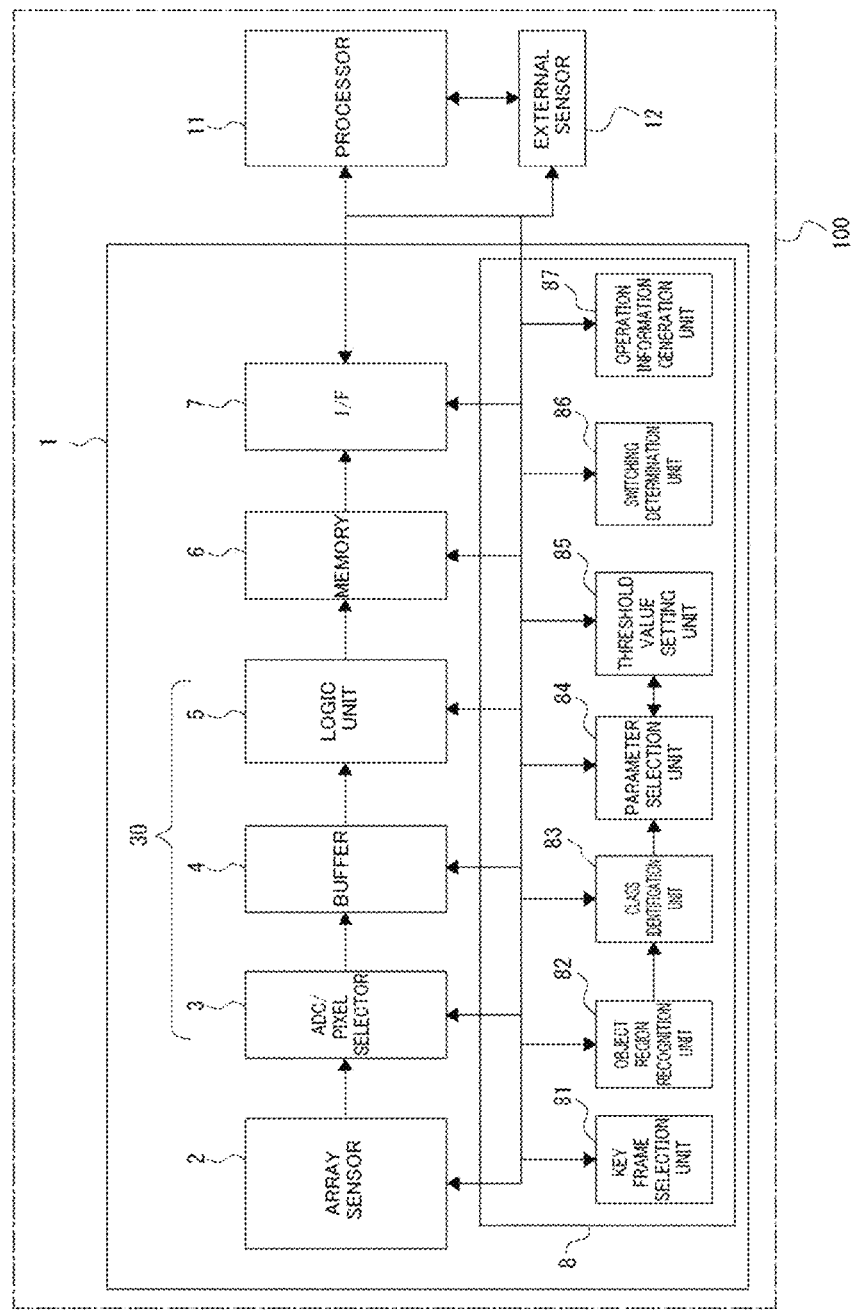
FIG. 19 is a block diagram illustrating another configuration example that can be applied to the embodiment.

FIG. 19 illustrates a configuration example in which the arithmetic operation unit 8 is provided separately from the sensor apparatus 1 in the device 100. The arithmetic operation unit 8 is provided in the device 100 as a chip separate from the sensor apparatus 1 and can communicate with the sensor apparatus 1 and the processor 11 through the interface unit 7.

In addition, the arithmetic operation unit 8 is provided with functions as the switching determination unit 86 and the operation information generation unit 87, and thus it is possible to perform the same processing as in the case of FIG. 1.

Figure 20:
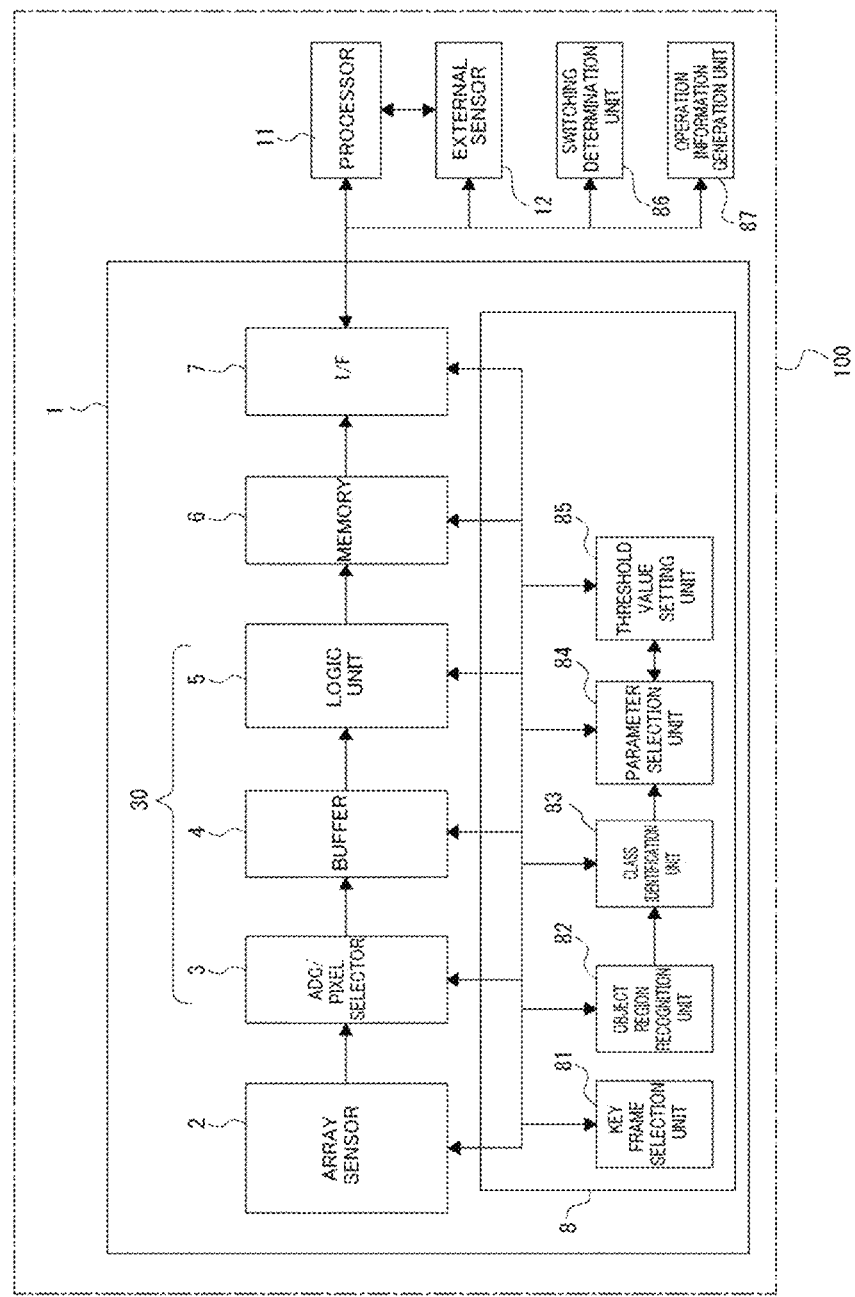
FIG. 20 is a block diagram illustrating still another configuration example that can be applied to the embodiment.

A configuration example in FIG. 20 shows a configuration in which the switching determination unit 86 and the operation information generation unit 87 are provided separately from the arithmetic operation unit 8.

Although not illustrated in the drawing, the switching determination unit 86 and the operation information generation unit 87 may be constituted by a separate processor or the like in a configuration in which the sensor apparatus 1 and the arithmetic operation unit 8 are separately provided as in FIG. 19.

Further, it is also conceivable that the key frame selection unit 81, the object region recognition unit 82, the class identification unit 83, the parameter selection unit 84, the threshold value setting unit 85, and the like are disposed outside the sensor apparatus 1 or outside the arithmetic operation unit 8.

In addition, the arithmetic operation unit 8 does not need to have all of the functions illustrated in the drawing. For example, some of the key frame selection unit 81, the object region recognition unit 82, the class identification unit 83, the parameter selection unit 84, and the threshold value setting unit 85 may not be provided. In addition, it is also conceivable to adopt an example in which only one of the switching determination unit 86 and the operation information generation unit 87 is provided.

6. Conclusion and Example of Application to Each Processing

In the above-described embodiment, the following effects are obtained.

The sensor apparatus 1 of the embodiment includes the array sensor 2, the signal processing unit 30, and the arithmetic operation unit 8 (switching determination unit 86). In the array sensor 2, a plurality of detection elements are arranged one-dimensionally or two-dimensionally. The signal processing unit 30 performs signal processing on a detected signal obtained by the array sensor 2. The arithmetic operation unit 8 performs object detection from the detected signal obtained by the array sensor 2, performs operation control of the signal processing unit based on the object detection, and performs switching processing for changing processing contents based on device information which is input from the sensor-equipped device 100 on which the sensor apparatus 1 itself is mounted. Processing in the signal processing unit 30 is controlled by the arithmetic operation unit 8 based on object detection, and thus a signal processing operation suitable for an object to be detected is performed. For example, parameter setting corresponding to an object to be detected, designation of a sampling area, and efficient processing control having a high power saving effect according to a frame rate or the like are performed.

Then, switching of operation setting is performed in accordance with device information of the device 100, and thus it is possible to execute a processing operation adapted to the situation of the device 100 and perform switching according to a situation such as power saving priority or reliability priority.

Thus, the sensor apparatus 1 can be autonomously optimized as a device-mounted sensor apparatus 1.

In the embodiment, description has been given of an example in which the arithmetic operation unit 8 (operation information generation unit 87) performs processing for generating sensor operation information based on object detection or a processing operation of the signal processing unit 30 and transmitting the generated sensor operation information to the device 100 (for example, the processor 11).

Information on the processing of the signal processing unit 30 and object detection in the arithmetic operation unit 8, and the like are transmitted to the device 100, and thus the device 100 can execute a state suitable for the operation of the sensor apparatus 1. For example, a state suitable for sensing of the sensor apparatus 1 is obtained by approaching an imaging target or changing an imaging direction.

Thus, the sensor apparatus 1 an also autonomously perform optimization in association with the device 100 having the sensor apparatus 1 mounted thereon. In addition, the processor 11 can also reduce calculation costs of a process by using metadata which is output by an object detection function of the sensor apparatus 1. For this reason, it is useful for reducing power consumption and data amount. In addition, an application (the processor 11) can perform an optimal operation by using metadata which is output by the sensor apparatus 1, and it is also possible to improve the performance and efficiency of the entire movement of the sensor-equipped device 100.

In the embodiment, description has been given of an example in which the arithmetic operation unit 8 (switching determination unit 86) performs switching processing based on previously registered registration information (hardware/application information) on the device 100 or registration information (switching condition information) as operation switching conditions.

An appropriate processing operation of the sensor apparatus 1 varies depending on the type of device 100 (processor 11), processing capability, an operation function, an operation function of an application, or the like. In addition, conditions for switching an operation state also vary. Consequently, the necessary information is registered in advance, and switching processing is performed accordingly. Thereby, the sensor apparatus 1 can be used for various types of devices 100 in general, and optimization can be performed to be adapted to the devices 100.

In the embodiment, an example in which the arithmetic operation unit 8 acquires power supply information as device information has been described.

By acquiring the power supply information of the device 100 as device information, the sensor apparatus 1 can execute switching processing for performing processing corresponding to a power supply state. Thereby, it is possible to achieve power saving of the device 100, an increase in an operation time, and the like.

In the embodiment, an example in which the arithmetic operation unit 8 acquires communication status information as device information has been described.

By acquiring the communication status information as device information, the sensor apparatus 1 can execute switching processing for performing processing corresponding to a communication situation. For example, it is possible to reduce unnecessary energy consumption by decreasing a frame rate due to deterioration of a communication situation or to prevent a packet loss or the like from occurring in transfer from the device 100 to external equipment.

In the embodiment, an example in which the arithmetic operation unit 8 acquires information on hardware or an application as device information has been described.

By acquiring the information on hardware of the device 100, the sensor apparatus 1 can perform processing corresponding to the configuration and functions of the device 100. In addition, it is possible to set metadata which is output in accordance with an application by acquiring the information on an application. Thereby, it is possible to make the processing of the signal processing unit appropriate in accordance with a hardware configuration and an application and to perform switching processing.

In the embodiment, description has been given of an example in which the arithmetic operation unit 8 performs processing for performing class identification for an object to be detected from a detected signal obtained by the array sensor 2 and selecting parameters used for signal processing of the signal processing unit 30 based on the identified class, as processing related to switching processing.

That is, although the logic unit 5 performs image processing on an image signal obtained by the array sensor 2 as processing of "classification image adaptation", parameters of the image processing are set based on class identification of a detected object in the image signal.

In a case where object detection from an image is performed, an image with high quality seen by a person is not necessarily an image with high recognition accuracy. In addition, desired image quality varies depending on the class of an object to be recognized. That is, an image that has been subjected to image processing through normal parameter setting to achieve high image quality when visually recognized does not necessarily have image quality suitable for object detection. In addition, desired image processing parameters vary depending on the class of an object to be recognized.

Consequently, a parameter set is held in advance for each class, and a parameter set to be used is selected in accordance with class identification of a detected object in a captured image. Thereby, image processing suitable for the detection of a target object is performed. According to an image having been subjected to such image processing, it is possible to realize an improvement in accuracy in object detection.

In addition, desired image quality adjustment for object detection is different from image quality adjustment for making a person feel beautiful, and thus, for example, a blur filter for giving priority to beauty is not used. For this reason, parameters that are set often result in a low processing load.

In addition, the amount of data is often reduced depending on parameters corresponding to a class (for example, parameters related to gradation change and compression). In this case, it is also possible to avoid a delay in processing and an increase in power consumption of the entire system due to a high load on the processor 11 side.

In addition, as switching processing based on device information, it is assumed that a parameter set corresponding to a class is switched. For example, a plurality of parameter sets corresponding to a class "person" are prepared and switched between in accordance with device information, and thus a parameter set corresponding to a class is also switched in accordance with the state of the device 100 in the signal processing unit 30.

In addition, as switching processing based on device information, it may be possible to switch whether or not to execute classification image adaptation. Thereby, it is possible to optimize the operation of the sensor apparatus 1 in accordance with device information.

In addition, information of the class in object detection, a confidence rate, information of an object area, information on whether or not a target class has been detected, and the like may be output to the device 100.

In the embodiment, description has been given of an example in which the arithmetic operation unit 8 sets, based on device information, a threshold value for all or some of parameters used for signal processing of the signal processing unit 30 or detection processing of the array sensor 2 to perform processing using the parameters that are set based on the threshold value, as processing related to switching processing.

That is, as described in the "image adaptation through threshold value setting", the arithmetic operation unit 8 includes the threshold value setting unit 85 that sets a threshold value of a parameter for all or some of parameters used for image processing of the logic unit 5 or imaging processing related to imaging of the array sensor 2 and performs processing using the parameters that are set based on the threshold value.

By setting (changing) the parameters using the threshold value, for example, an image signal can be output with minimum required quality for processing such as object detection (for example, a minimum required resolution), or the like. Thus, it is also possible not to reduce the performance, accuracy, and the like of the subsequent processing (object detection and the like) while reducing the amount of data in an image signal to be output.

In addition, by setting a threshold value in accordance with device information, it is possible to realize a reduction in power consumption in accordance with the state of the device, for example, the state of a battery, or the like, an increase in the speed of processing of the device 100 as necessary, and the like.

In the embodiment, description has been given of an example in which the arithmetic operation unit 8 performs object detection from a detected signal obtained by the array sensor 2 and performs processing for giving an instruction for region information generated based on the detection of the object to the signal processing unit 30 as region information on the acquisition of the detected signal obtained by the array sensor 2 or signal processing of the detected signal, as processing related to switching processing.

As described in the "area clipping", the arithmetic operation unit 8 of the sensor apparatus 1 performs object detection from a detected signal obtained by the array sensor 2 and gives an instruction for region information (the ROI 21 and the AROI 22) generated based on the detection of the object to the signal processing unit 30 as region information on the acquisition of the detected signal obtained by the array sensor 2 or signal processing of the detected signal.

That is, the signal processing unit 30 performs signal processing on the detected signal obtained by the array sensor 2 and outputs the processed signal from the interface unit 7, but region information on the acquisition of the detected signal obtained by the array sensor 2 or signal processing of the detected signal in the signal processing unit 30 is set based on object detection.

In a case where object detection from an image is performed as in the embodiment, information on all pixels in each frame is not always required. For example, in a case where a person is detected, it is only required that there is detection information of a region in which the person appears in a frame.

Consequently, the arithmetic operation unit 8 generates the ROI 21 and the AROI 22 based on object detection, and processing of the signal processing unit 30, that is, the acquisition of a detected signal from the array sensor 2 by the ADC/pixel selector 3 and compression processing in the logic unit 5 are performed using the ROI 21 and the AROI 22.

Thereby, it is possible to realize a reduction in the amount of data of a processing target and an improvement in a processing speed and to obtain an image signal that does not decrease the accuracy of detection.

Then, it is possible to switch whether or not to perform such area clipping in accordance with device information.

In addition, it is also conceivable to switch a setting range of the ROI 21 in accordance with device information while area clipping is performed.

In addition, it is also conceivable to switch the size and resolution of a key frame to be subjected to full-screen scanning in accordance with device information. Thereby, it is possible to optimize the operation of the sensor apparatus 1 in accordance with device information.

Note that the present invention is not limited to an image signal, and object detection is also performed on a detected signal obtained by the array sensor 2 as a sound wave detected signal, a tactile detected signal, or the like, and the signal processing unit 30 can also receive an instruction for region information generated based on the detection of the object as region information on the acquisition of the detected signal from the array sensor 2 or signal processing of the detected signal.

Thereby, also in a case where a sound wave sensor array and a tactile sensor array are used, it is possible to adaptively realize a reduction in the amount of data of a processing target, an improvement in a processing speed, and the like in accordance with device information, and to obtain an effect of obtaining a detected signal that does not decrease the accuracy of detection.

In the embodiment, description has been given of an example in which the arithmetic operation unit 8 performs processing for detecting an object from a detected signal obtained by the array sensor 2, giving an instruction of region information generated based on the detection of the object to the signal processing unit 30 as region information on the acquisition of the detected signal obtained by the array sensor 2 or signal processing of the detected signal, performing class identification on the object detected from the detected signal obtained by the array sensor 2, and generating region information corresponding to the object using a template corresponding to an identified class, as processing related to switching processing.

As described in the "area clipping using AROI", the arithmetic operation unit 8 performs class identification on an object detected from a detected signal obtained by the array sensor 2 and generates region information (AROI 22) corresponding to the object using a template corresponding to the identified class.

By using the template corresponding to the class, it is possible to generate the AROI 22 that adapts to an important region different for each class.

In particular, in a case where the array sensor 2 is constituted by an imaging element, power consumption in photoelectric conversion is the largest. In this case, the number of pixels to be subjected to photoelectric conversion is desired be reduced as much as possible. By narrowing down pixels to be subjected to photoelectric conversion in accordance with a template, it is possible to effectively reduce the amount of data without affecting the accuracy of detection. In particular, it is important that an image is an image in which the processor 11 can accurately recognize an object rather than an image that a person does not see but feels beautiful. An image in which pixels subjected to photoelectric conversion and converted into digital data using a template are designated is suitable for effective object detection with a small amount of data.

In addition, the template indicates a region in which a detected signal is acquired for each class.

For example, the template indicates a detection element for which detection information should be acquired among the detection elements of the array sensor in accordance with classes such as a "person" and an "automobile" (see FIGS. 7 and 8).

It is possible to read appropriate information from the array sensor 2 for each class by using a template for designating pixels to be read which correspond to a class. In particular, a portion (a part of a face or a part of a number plate) is made dense as illustrated in the examples of FIGS.

7 and 8, and thus information on a particularly necessary part can also be intensively acquired for each class.

It is possible to switch whether or not to perform area clipping using such an AROI 22 in accordance with device information.

Alternatively, it is also conceivable to prepare a plurality of templates for each class and select a template to be used for a certain class in accordance with device information.

Thereby, it is possible to optimize the operation of the sensor apparatus 1 in accordance with device information.

In the embodiment, description has been given of an example in which the arithmetic operation unit 8 performs processing for setting threshold values of parameters for all or some of the parameters used for signal processing of the signal processing unit 30 or detection processing of the array sensor 2 and setting parameters of processing for region information indicated by a template based on the threshold values, as processing related to switching processing.

As described in the "area clipping using threshold value setting and AROI", the arithmetic operation unit 8 performs class identification on an object detected from a detected signal obtained by the array sensor 2 and generates region information (AROI 22) corresponding to the object using a template corresponding to the identified class. In this case, the AROI 22 in which parameters such as a resolution which are calculated based on a threshold value are recorded is used.

By setting (changing) parameters of an acquired region indicated by the AROI 22 by using a threshold value, for example, an image signal can be output with minimum required quality for processing such as object detection (for example, a minimum required resolution), or the like.

In addition, an image in which pixels subjected to photoelectric conversion and converted into digital data using a template are designated is suitable for effective object detection with a small amount of data.

Thus, by using a template and setting parameters such as a resolution using a threshold value, it is also possible not to reduce the performance, accuracy, and the like of the subsequent processing (object detection and the like) while reducing the amount of data in an image signal to be output. Thereby, it is also possible to realize a reduction in power consumption and an increase in the speed of processing.

In addition, a template indicates a region in which a detected signal is acquired for each class such as a "person" or an "automobile", and thus information on a particularly necessary part can also be intensively acquired for each class.

It is possible to switch whether or not to perform area clipping using such threshold value setting and the AROI 22 in accordance with device information. Thereby, it is possible to optimize the operation of the sensor apparatus 1 in accordance with device information.

In the embodiment, description has been given of an example in which the arithmetic operation unit 8 performs object detection from a detected signal obtained by the array sensor 2, gives an instruction for region information generated based on the detection of the object to the signal processing unit 30 as region information on the acquisition of the detected signal obtained by the array sensor 2 or signal processing of the detected signal as processing related to switching processing, and the signal processing unit 30 performs compression processing using a compression rate different for each region on the detected signal obtained by the array sensor 2 based on the region information received from the arithmetic operation unit 8.

That is, as described in the "intelligent compression", in the signal processing unit 30, the logic unit 5 performs compression processing of the detected signal obtained by the array sensor 2, but the logic unit 5 performs compression processing using a compression rate different for each region based on the region information received from the arithmetic operation unit 8 (see FIG. 10).

Thereby, the signal processing unit 30 (logic unit 5) can perform data compression so as not to reduce important information by making a compression ratio different between an important area and a less important area in a frame.

For example, the logic unit 5 performs compression processing at a low compression rate in a region designated by region information, and performs compression processing at a high compression rate in the other regions.

The signal processing unit 30 (logic unit 5) performs compression processing at a low compression rate in a region designated by the ROI 21 and reduces the amount of data at a high compression ratio in the other regions from the next frame in which an object is detected. Since the ROI 21 is generated in accordance with object detection, a region indicated by the ROI 21 is an important region for object detection in the processor 11 and has a low compression ratio, so that information is not reduced. Thereby, the accuracy of detection is not reduced. On the other hand, regions other than the region indicated by the ROI 21 are regions that do not affect object detection so much, and thus it is possible to perform compression at a high compression rate and efficiently reduce the amount of data.

Then, it is possible to switch whether or not to perform compression processing as such intelligent compression in accordance with the device information. Alternatively, even when intelligent compression is performed at all times, switching processing can be performed so as to change a compression rate in accordance with device information.

Thereby, it is possible to optimize the operation of the sensor apparatus 1 in accordance with device information.

In the embodiment, description has been given of an example in which the arithmetic operation unit 8 performs processing for setting an active area for a detected signal acquired from the array sensor 2 based on information on past region information, performing object detection from a detected signal of the active area, and giving an instruction for region information generated based on the detection of the object to the signal processing unit 30 as region information on the acquisition of the detected signal from the array sensor 2 or signal processing of the detected signal, as processing related to switching processing. As described in the "active area clipping", the arithmetic operation unit 8 sets the active area RA for a detected signal acquired from the array sensor 2 based on information related to past region information (the bounding box 20 of an object detection region which is the source of region information, the ROI 21 which is region information itself, and the AROI 22).

In addition, object detection is performed from the detected signal of the active area RA, and the signal processing unit 30 is given an instruction for the ROI 21 and the AROI 22 generated based on the detection of the object as region information on the acquisition of the detected signal from the array sensor 2 or signal processing of the detected signal.

Thereby, a processing load of the object detection for setting the ROI 21 and the AROI 22 is significantly reduced. Thus, it is possible to obtain effects of reducing a processing load, increasing the speed, and reducing power consumption.

Then, it is possible to switch whether or not to perform such active area clipping in accordance with device information.

Thereby, it is possible to optimize the operation of the sensor apparatus 1 in accordance with device information.

In the embodiment, description has been given of an example in which the arithmetic operation unit 8 performs processing for performing object detection from a detected signal obtained by the array sensor 2 and giving an instruction for making a frame rate of the detected signal obtained by the array sensor 2 variable based on the detection of the object, as processing related to switching processing. As described in the "active sampling", the arithmetic operation unit 8 performs object detection from a detected signal obtained by the array sensor 2 and gives an instruction for making a frame rate of the detected signal obtained by the array sensor 2 variable based on the detection of the object.

In a case where object detection from an image is performed, image signals having a high frame rate are not always required. For example, in a case where a person is detected, it does not matter if a frame rate is low in a frame without a person. In contrast, a frame rate is increased during a period in which a person appears, and thus the amount of information becomes abundant, and the number of objects (persons) detected and information that can be recognized in association with the object detection can also be increased.

That is, by changing a frame rate in accordance with the detection of an object, it is possible to adaptively increase the amount of data when needed, reduce the amount of data when not needed, and reduce the amount of processed data and the amount of transferred without degrading object detection performance.

Then, it is possible to switch whether or not to perform such active sampling in accordance with device information.

Alternatively, in a case where active sampling is performed, sampling rates in a normal mode and an idling mode can be switched between in accordance with device information.

Thereby, it is possible to optimize the operation of the sensor apparatus 1 in accordance with device information.

Note that the present invention is not limited to an image signal, and object detection is also performed on a detected signal obtained by the array sensor 2 as a sound wave detected signal, a tactile detected signal, or the like, and an instruction for making a frame rate of the detected signal obtained by the array sensor 2 variable can be given based on the detection of the object. Thereby, even in a case where a sound wave sensor array and a tactile sensor array are used, an effect that it is possible to adaptively increase the amount of data when needed, reduce the amount of data when not needed, and reduce the amount of processed data and the amount of transferred without degrading object detection performance is obtained.

A frame is an image frame in a case where the array sensor 2 is an imaging element array, but has the same meaning in the case of a sound detection element or a tactile sensor element. The frame is a unit of data which is read in one read period from the plurality of detection elements of the array sensor 2 regardless of the type of array sensor 2. A frame rate is the density of such a frame within a unit time.

In the embodiment, description has been given of an example in which the arithmetic operation unit 8 performs processing for setting a threshold value of a frame rate in accordance with a class identified for an object detected from a detected signal obtained by the array sensor 2 by using a frame rate set based on the threshold value, as processing related to switching processing.

Figure 14:
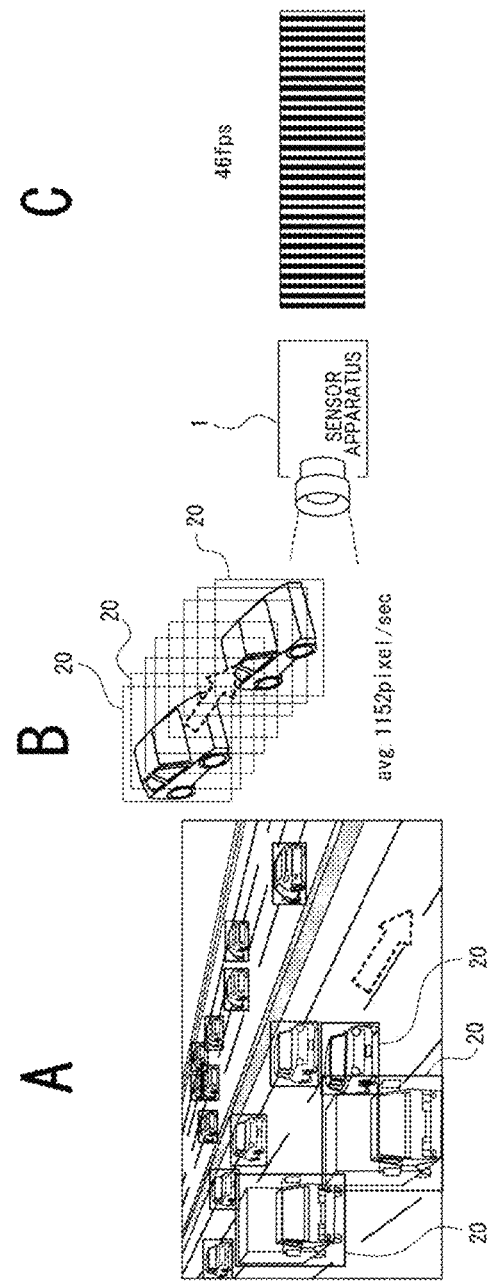
FIG. 14 is a diagram illustrating active sampling according to the embodiment.
Figure 15:
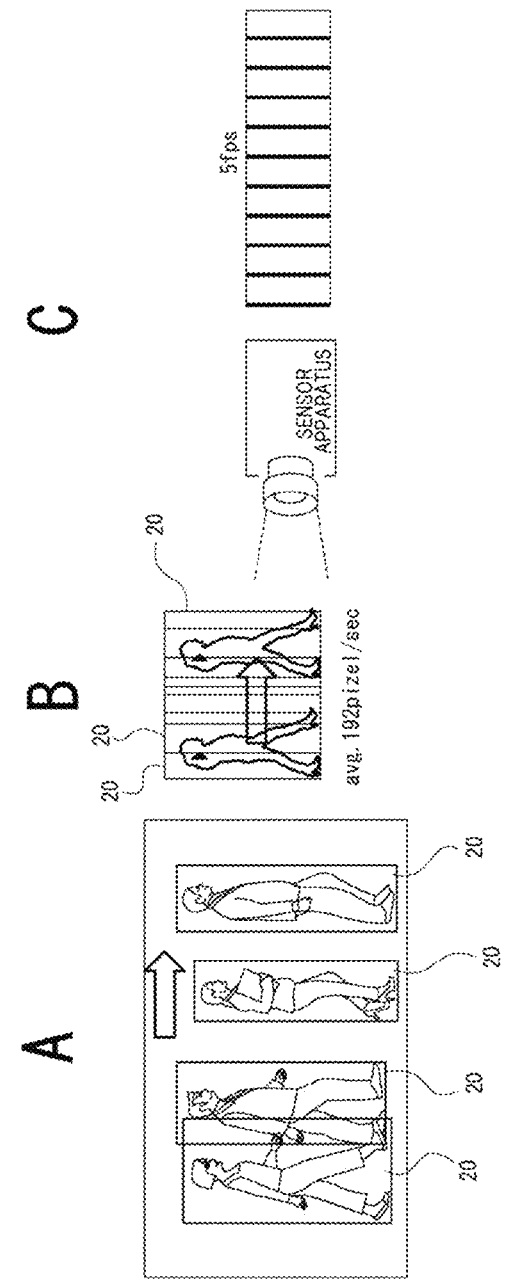
FIG. 15 is a diagram illustrating active sampling according to the embodiment.

As described in the "active sampling through threshold value setting", a threshold value of a frame rate is set in accordance with a class identified for an object detected from a detected signal obtained by the array sensor 2, and processing using a frame rate set based on the threshold value is performed (see FIGS. 14 and 15).

A frame rate suitable for the class of a detection target can be applied by setting (changing) a frame rate using a threshold value. Specifically, it is possible to realize a reduction in the amount of data of an image signal, a reduction in power consumption, and an increase in the speed of processing by decreasing a frame rate without degrading object detection performance of a class of a detection target.

Then, it is possible to switch whether or not to perform such active sampling through threshold value setting in accordance with device information. Alternatively, in a case where active sampling is performed through threshold value setting, a sampling rate can be switched in accordance with device information.

Thereby, it is possible to optimize the operation of the sensor apparatus 1 in accordance with device information.

The technology of the present disclosure is not limited to the configuration example in the embodiment, and various modification examples are assumed.

The configuration of the sensor apparatus 1 is not limited to those illustrated in FIGS. 3, 19, and 20.

The array sensor 2 is not limited to pixels that receive visible light, and may be provided with a plurality of imaging elements for invisible light.

Note that the advantageous effects described in the present specification are merely exemplary and are not limited, and other advantageous effects may be obtained.

Note that the present technology can also adopt the following configurations.

(1) A sensor apparatus including:
  an array sensor in which a plurality of detection elements are arranged one-dimensionally or two-dimensionally;
  a signal processing unit which performs signal processing on a detected signal obtained by the array sensor; and
  an arithmetic operation unit which performs object detection from the detected signal obtained by the array sensor, performs operation control of the signal processing unit based on object detection, and performs switching processing for changing processing contents based on device information input from a sensor-equipped device on which the sensor apparatus is mounted.

(2) The sensor apparatus according to (1), wherein the arithmetic operation unit performs processing for generating sensor operation information based on the object detection or the processing operation of the signal processing unit and transmitting the generated sensor operation information to the sensor-equipped device.

(3) The sensor apparatus according to (1) or (2), wherein the arithmetic operation unit performs the switching processing based on previously registered registration information on the sensor-equipped device or registration information as operation switching conditions.

(4) The sensor apparatus according to any one of (1) to (3), wherein the arithmetic operation unit acquires power supply information as the device information.

(5) The sensor apparatus according to any one of (1) to (4), wherein the arithmetic operation unit acquires communication status information as the device information.

(6) The sensor apparatus according to any one of (1) to (5), wherein the arithmetic operation unit acquires information on a hardware or application of the sensor-equipped device as the device information.

(7) The sensor apparatus according to any one of (1) to (6), wherein the arithmetic operation unit performs processing for performing class identification on an object detected from the detected signal obtained by the array sensor and selecting parameters used for signal processing of the signal processing unit based on the identified class, as processing related to the switching processing.

(8) The sensor apparatus according to any one of (1) to (7), wherein the arithmetic operation unit sets, based on the device information, a threshold value for all or some of parameters used for signal processing of the signal processing unit or detection processing of the array sensor and to perform processing using parameters set based on the threshold value, as processing related to the switching processing.

(9) The sensor apparatus according to any one of (1) to (8), wherein the arithmetic operation unit performs processing for performing object detection from the detected signal obtained by the array sensor and giving an instruction for region information generated based on the detection of the object to the signal processing unit as region information on acquisition of the detected signal from the array sensor or signal processing of the detected signal, as processing related to the switching processing.

(10) The sensor apparatus according to any one of (1) to (9), wherein the arithmetic operation unit performs processing for performing object detection from the detected signal obtained by the array sensor, giving an instruction for region information generated based on the detection of the object to the signal processing unit as region information on acquisition of the detected signal from the array sensor or signal processing of the detected signal, performing class identification for an object detected from the detected signal obtained by the array sensor, and generating region information corresponding to the object using a template corresponding to the identified class, as processing related to the switching processing.

(11) The sensor apparatus according to (10), wherein the arithmetic operation unit performs processing for setting threshold values of parameters for all or some of the parameters used for signal processing of the signal processing unit or detection processing of the array sensor and setting parameters of processing for region information indicated by the template based on the threshold values, as processing related to the switching processing.

(12) The sensor apparatus according to any one of (1) to (11), wherein the arithmetic operation unit performs processing for performing object detection from the detected signal obtained by the array sensor and giving an instruction for region information generated based on the detection of the object to the signal processing unit as region information on acquisition of the detected signal from the array sensor or signal processing of the detected signal, as processing related to the switching processing, and the signal processing unit performs compression processing at a compression ratio different for each region on the detected signal obtained by the array sensor based on the region information received from the arithmetic operation unit.

(13) The sensor apparatus according to any one of (1) to (12), wherein the arithmetic operation unit performs processing for setting an active area for the detected signal acquired from the array sensor based on information on past region information, performing object detection from a detected signal of the active area, and giving an instruction for region information generated based on the detection of the object to the signal processing unit as region information on acquisition of the detected signal from the array sensor or signal processing of the detected signal, as processing related to the switching processing.

(14) The sensor apparatus according to any one of (1) to (13), wherein the arithmetic operation unit performs processing for performing object detection from the detected signal obtained by the array sensor and giving an instruction for making a frame rate of the detected signal obtained by the array sensor variable based on the detection of the object, as processing related to the switching processing.

(15) The sensor apparatus according to (14), wherein the arithmetic operation unit sets a threshold value of the frame rate in accordance with a class identified for an object detected from the detected signal obtained by the array sensor to perform processing using a frame rate set based on the threshold value, as processing related to the switching processing.

(16) A sensor-equipped device including:
a sensor apparatus; and
a control unit which is able to communicate with the sensor apparatus,
wherein the sensor apparatus includes
an array sensor in which a plurality of detection elements are arranged one-dimensionally or two-dimensionally,
a signal processing unit which performs signal processing on a detected signal obtained by the array sensor, and
an arithmetic operation unit which performs object detection from the detected signal obtained by the array sensor, performs operation control of the signal processing unit based on object detection, and performs switching processing of operation setting of the signal processing unit based on device information input from the control unit.

(17) The sensor apparatus according to (16), wherein the arithmetic operation unit performs processing for generating sensor operation information based on a state of a processing operation of the signal processing unit or a state of object detection and transmitting generated sensor operation information to the control unit, and
the control unit controls a device operation based on the sensor operation information.

(18) A processing method of a sensor apparatus including an array sensor in which a plurality of detection elements are arranged one-dimensionally or two-dimensionally, and a signal processing unit which performs signal processing on a detected signal obtained by the array sensor, the processing method including:
performing object detection from the detected signal obtained by the array sensor,
performing operation control of the signal processing unit based on object detection, and performing switching processing for changing processing contents based on device information input from a sensor-equipped device on which the sensor apparatus is mounted.

REFERENCE SIGNS LIST

1 Sensor apparatus
2 Array sensor
3 ADC/pixel selector
4 Buffer
5 Logic unit
6 Memory
7 Interface unit
8 Arithmetic operation unit 11 Processor
12 External sensor
30 Signal processing unit
50 Device-side processing unit
81 Key frame selection unit
82 Object region recognition unit
83 Class identification unit
84 Parameter selection unit
85 Threshold value setting unit
86 Switching determination unit
87 Operation information generation unit
100 Sensor-equipped device

The invention claimed is:

1. A sensor apparatus comprising:
an array sensor in which a plurality of detection elements are arranged one-dimensionally or two-dimensionally;
signal processing circuitry configured to perform signal processing on a detected signal obtained by the array sensor; and
arithmetic operation circuitry configured to perform object detection from the detected signal obtained by the array sensor, to perform operation control of the signal processing circuitry based on the object detection, and to perform switching processing for changing processing contents of the signal processing circuitry based on device information input from a sensor-equipped device on which the sensor apparatus is mounted, wherein
the arithmetic operation circuitry is further configured to identify a class of an object detected from the detected signal obtained by the array sensor and, to select parameters used for the signal processing on the detected signal by the signal processing circuitry based on the class of the object, as processing related to the switching processing, the class of the object representing a category of the object recognized by image recognition of the object.

2. The sensor apparatus according to claim 1, wherein the arithmetic operation circuitry is further configured to perform processing for generating sensor operation information based on the object detection or the processing operation of the signal processing circuitry, and to transmit the generated sensor operation information to the sensor-equipped device.

3. The sensor apparatus according to claim 1, wherein the arithmetic operation circuitry is further configured to perform the switching processing based on previously registered registration information on the sensor-equipped device or registration information as operation switching conditions.

4. The sensor apparatus according to claim 1, wherein the arithmetic operation circuitry is further configured to acquire power supply information as the device information.

5. The sensor apparatus according to claim 1, wherein the arithmetic operation circuitry is further configured to acquire communication status information as the device information.

6. The sensor apparatus according to claim 1, wherein the arithmetic operation circuitry is further configured to acquire information on a hardware or application of the sensor-equipped device as the device information.

7. The sensor apparatus according to claim 1, wherein the arithmetic operation circuitry is further configured to perform the object detection from the detected signal obtained by the array sensor and to give an instruction for region information generated based on the object detection to the signal processing circuitry as region information relating to acquisition of the detected signal from the array sensor or signal processing of the detected signal, as processing related to the switching processing.

8. The sensor apparatus according to claim 1, wherein the arithmetic operation circuitry is further configured to perform the object detection from the detected signal obtained by the array sensor, to give an instruction for region information generated based on the object detection to the signal processing circuitry as region information relating to acquisition of the detected signal from the array sensor or signal processing of the detected signal, and generating region information corresponding to the object using a template corresponding to the class of the object, as processing related to the switching processing.

9. The sensor apparatus according to claim 8, wherein the arithmetic operation circuitry is further configured to set threshold values for all or some of the parameters used for the signal processing on the detected signal by the signal processing circuitry or used for detection processing of the array sensor, and to set parameters of processing for region information indicated by the template based on the threshold values, as processing related to the switching processing.

10. The sensor apparatus according to claim 1, wherein the arithmetic operation circuitry is further configured to perform the object detection from the detected signal obtained by the array sensor and to give an instruction for region information generated based on the object detection to the signal processing circuitry as region information relating to acquisition of the detected signal from the array sensor or signal processing of the detected signal, as processing related to the switching processing, and
the signal processing circuitry is further configured to perform compression processing at a compression ratio different for each region on the detected signal obtained by the array sensor based on the region information received from the arithmetic operation circuitry.

11. The sensor apparatus according to claim 1, wherein the arithmetic operation circuitry is further configured to set an active area for the detected signal acquired from the array sensor based on information on past region information, to perform the object detection from a detected signal of the active area, and to give an instruction for region information generated based on the object detection to the signal processing circuitry as region information relating to acquisition of the detected signal from the array sensor or signal processing of the detected signal, as processing related to the switching processing.

12. The sensor apparatus according to claim 1, wherein the arithmetic operation circuitry is further configured to perform the object detection from the detected signal obtained by the array sensor and to give an instruction for changing a frame rate of the detected signal obtained by the array sensor based on the object detection, as processing related to the switching processing.

13. The sensor apparatus according to claim 12, wherein the arithmetic operation circuitry is further configured to set a threshold value of the frame rate in accordance with the class of the object detected from the detected signal obtained by the array sensor, and to perform the signal processing using a frame rate set based on the threshold value, as processing related to the switching processing.

14. The sensor apparatus according to claim 1, wherein
the arithmetic operation circuitry is further configured to set, based on the device information, a threshold value for all or some of the parameters used for the signal processing on the detected signal by the signal processing circuitry or used for detection processing of the array sensor, and to perform the signal processing using parameters set based on the threshold value, as processing related to the switching processing.

15. A sensor apparatus comprising:
an array sensor in which a plurality of detection elements are arranged one-dimensionally or two-dimensionally;
signal processing circuitry configured to perform signal processing on a detected signal obtained by the array sensor; and
arithmetic operation circuitry configured to perform object detection from the detected signal obtained by the array sensor, to perform operation control of the signal processing circuitry based on the object detection, and to perform switching processing for changing processing contents of the signal processing circuitry based on device information input from a sensor-equipped device on which the sensor apparatus is mounted, wherein
the arithmetic operation circuitry is further configured to identify a class of an object detected from the detected signal obtained by the array sensor and, to select parameters used for the signal processing on the detected signal by the signal processing circuitry based on the class of the object, as processing related to the switching processing, the class of the object representing a category of the object recognized by image recognition of the object, and
the arithmetic operation circuitry is further configured to set, based on the device information, a threshold value for all or some of the parameters used for the signal processing on the detected signal by the signal processing circuitry or detection processing of the array sensor, and to perform the signal processing using parameters set based on the threshold value, as processing related to the switching processing.

16. A sensor-equipped device comprising:
a sensor apparatus; and
control circuitry configured to communicate with the sensor apparatus, wherein
the sensor apparatus includes
an array sensor in which a plurality of detection elements are arranged one-dimensionally or two-dimensionally,
signal processing circuitry configured to perform signal processing on a detected signal obtained by the array sensor, and
arithmetic operation circuitry configured to perform object detection from the detected signal obtained by the array sensor, to perform operation control of the signal processing circuitry based on the object detection, and to perform switching processing of operation setting of the signal processing circuitry based on device information input from the control circuitry, and further wherein
the arithmetic operation circuitry is further configured to identify a class of an object detected from the detected signal obtained by the array sensor and to select parameters used for the signal processing on the detected signal by the signal processing circuitry based on the class of the object, as processing related to the switching processing, the class of the object representing a category of the object recognized by image recognition of the object.

17. The sensor-equipped device according to claim 16, wherein
the arithmetic operation circuitry is further configured to perform processing for generating sensor operation information based on a state of the signal processing of the signal processing circuitry or a state of the object detection and to transmit the sensor operation information to the control circuitry, and
the control circuitry is further configured to control a device operation based on the sensor operation information.

18. A processing method executed by a sensor apparatus including an array sensor in which a plurality of detection elements are arranged one-dimensionally or two-dimensionally, and a signal processing circuitry configured to perform signal processing on a detected signal obtained by the array sensor, the processing method comprising:
performing object detection from the detected signal obtained by the array sensor;
performing operation control of the signal processing circuitry based on the object detection;
performing switching processing for changing processing contents of the signal processing circuitry based on device information input from a sensor-equipped device on which the sensor apparatus is mounted;
identifying a class of an object detected from the detected signal obtained by the array sensor, the class of the object representing a category of the object recognized by image recognition of the object; and
selecting parameters used for the signal processing on the detected signal by the signal processing circuitry based on the class of the object, as processing related to the switching processing.

* * * * *